(12) United States Patent
Savian et al.

(10) Patent No.: US 9,162,617 B2
(45) Date of Patent: *Oct. 20, 2015

(54) PIVOT BIN ASSEMBLY

(71) Applicant: C&D ZODIAC, INC., Huntington Beach, CA (US)

(72) Inventors: Scott Savian, Huntington Beach, CA (US); Stephen Kearsey, Herts (GB)

(73) Assignee: C&D Zodiac, Inc., Huntington Beach, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/765,652

(22) Filed: Feb. 12, 2013

(65) Prior Publication Data

US 2013/0206903 A1 Aug. 15, 2013

Related U.S. Application Data

(60) Provisional application No. 61/598,856, filed on Feb. 14, 2012, provisional application No. 61/598,816, filed on Feb. 14, 2012.

(51) Int. Cl.
*B64D 11/00* (2006.01)
*B60Q 3/02* (2006.01)
(Continued)

(52) U.S. Cl.
CPC .............. *B60Q 3/022* (2013.01); *A47B 46/00* (2013.01); *B60Q 3/02* (2013.01); *B60Q 3/025* (2013.01); *B64D 11/003* (2013.01); *B64D 11/0015* (2013.01); *B64D 13/00* (2013.01); *B64D 2011/0038* (2013.01); *Y02T 50/46* (2013.01); *Y10T 29/49002* (2015.01)

(58) Field of Classification Search
CPC ...................... B64D 11/003; B64D 2011/0046
USPC ............ 244/118.5; 312/242, 245, 248, 319.2, 312/319.3, 325–328
See application file for complete search history.

(56) References Cited

U.S. PATENT DOCUMENTS 4,597,599 A * 7/1986 Bisbing .......................... 292/174
4,637,642 A * 1/1987 Stoecker ........................ 292/129
(Continued)

FOREIGN PATENT DOCUMENTS

EP 1299020 12/2005
WO 2010114057 A1 10/2010

OTHER PUBLICATIONS

International Search Report and Written Opinion issued in PCT/US2013/025962 on Apr. 19, 2013.

*Primary Examiner* — Tien Dinh
*Assistant Examiner* — Christopher Hutchens
(74) *Attorney, Agent, or Firm* — Jeffer Mangels Butler & Mitchell LLP; Brennan C. Swain, Esq.

(57) ABSTRACT

A pivot bin assembly configured to receive luggage and be positioned in the interior of an aircraft. The pivot bin assembly includes an upper housing that includes a strongback and first and second side panels, a bucket that cooperates with the upper housing to define a bin interior, a first pivot mechanism operatively associated with the first side panel and the bucket, and a second pivot mechanism operatively associated with the second side panel and the bucket. The first and second pivot mechanisms are axially aligned along and are rotatable about a pivot axis such that the bucket pivots about the pivot axis with respect to the upper housing between an open position and a closed position.

36 Claims, 20 Drawing Sheets

(51) Int. Cl.
*A47B 46/00* (2006.01)
*B64D 13/00* (2006.01)

(56) References Cited

U.S. PATENT DOCUMENTS

| | | | |
|---|---|---|---|
| 4,917,747 A | 4/1990 | Chin et al. | |
| 5,108,048 A | 4/1992 | Chang | |
| 5,129,597 A | 7/1992 | Manthey | |
| 5,383,628 A | 1/1995 | Harriehausen | |
| 5,456,529 A | 10/1995 | Cheung | |
| 5,460,252 A | 10/1995 | Kosugi | |
| 5,567,028 A | 10/1996 | Lutovsky et al. | |
| 5,651,733 A | 7/1997 | Schumacher | |
| 5,709,460 A | 1/1998 | Lester | |
| 5,823,472 A | 10/1998 | Luria | |
| 5,842,668 A | 12/1998 | Spencer | |
| 5,934,615 A | 8/1999 | Treichler et al. | |
| 6,045,204 A | 4/2000 | Frazier et al. | |
| 6,315,436 B1 | 11/2001 | Schenk et al. | |
| 6,338,517 B1 | 1/2002 | Canni | |
| 6,350,048 B1 | 2/2002 | Stanton | |
| 6,398,163 B1 | 6/2002 | Welch | |
| 6,402,354 B1 | 6/2002 | Tatewaki | |
| 6,494,404 B1 | 12/2002 | Meyer | |
| 6,550,878 B2 | 4/2003 | Nott et al. | |
| 6,574,835 B2 | 6/2003 | Melhuish | |
| 6,634,061 B1 | 10/2003 | Maynard | |
| 6,886,781 B2 | 5/2005 | Lau | |
| 7,090,314 B2 * | 8/2006 | Burrows et al. | 312/246 |
| 7,258,406 B2 | 8/2007 | Stephan et al. | |
| 7,302,150 B2 * | 11/2007 | Druckman et al. | 385/134 |
| 7,422,352 B2 | 9/2008 | Sakakibara | |
| 7,601,004 B2 * | 10/2009 | Lamoree et al. | 439/11 |
| 7,896,530 B2 | 3/2011 | Budinger | |
| 7,966,696 B2 | 6/2011 | Krammer | |
| 7,992,928 B2 | 8/2011 | Kimizuka | |
| 8,011,618 B2 | 9/2011 | Bock | |
| 8,016,231 B2 * | 9/2011 | Hillen et al. | 244/118.5 |
| 8,136,897 B2 | 3/2012 | Mascari | |
| 8,146,227 B2 * | 4/2012 | Schmitz et al. | 29/434 |
| 8,651,548 B2 * | 2/2014 | Shirase | 296/37.12 |
| 8,770,515 B1 * | 7/2014 | Cloud et al. | 244/118.5 |
| 2003/0046792 A1 | 3/2003 | Thorn et al. | |
| 2004/0245897 A1 * | 12/2004 | Stephan et al. | 312/246 |
| 2005/0040287 A1 * | 2/2005 | Stephan et al. | 244/118.5 |
| 2006/0175368 A1 | 8/2006 | Fallis | |
| 2006/0207471 A1 | 9/2006 | Todori et al. | |
| 2006/0214055 A1 | 9/2006 | Novak | |
| 2007/0053188 A1 | 3/2007 | New et al. | |
| 2008/0078871 A1 * | 4/2008 | Munson et al. | 244/118.5 |
| 2008/0112754 A1 | 5/2008 | Schmitz | |
| 2008/0122331 A1 | 5/2008 | Haeberle | 312/319.1 |
| 2010/0206985 A1 * | 8/2010 | Rahlff | 244/118.5 |
| 2011/0139929 A1 | 6/2011 | Young | |
| 2011/0163697 A1 | 7/2011 | Mizukami | |
| 2011/0240796 A1 * | 10/2011 | Schneider | 244/118.5 |
| 2011/0253837 A1 * | 10/2011 | Lee et al. | 244/118.5 |
| 2012/0012707 A1 | 1/2012 | Schliwa | |
| 2012/0038254 A1 | 2/2012 | Rafler | |
| 2012/0074258 A1 | 3/2012 | Rapke | |
| 2012/0228426 A1 * | 9/2012 | Schneider et al. | 244/118.5 |
| 2012/0273615 A1 * | 11/2012 | Rafler | 244/118.5 |

* cited by examiner

PIVOT BIN ASSEMBLY

CROSS REFERENCE TO RELATED APPLICATIONS

This application claims the benefit of U.S. Provisional Application No. 61/598,856, filed Feb. 14, 2012, and U.S. Provisional Application No. 61/598,816, filed Feb. 14, 2012, which are both herein incorporated by reference in their entireties.

FIELD OF THE INVENTION

The present invention relates generally to overhead storage bin assemblies, and more particularly to an overhead storage bin assembly that includes a pivot bin and personal service unit.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include overhead luggage storage bins mounted from the ceiling, walls or other structural portion of the aircraft over the passenger seats. These bins are designed to accommodate the size, shape, and weight of passenger carry-on luggage.

Other overhead storage bin assemblies are well known in the art. For example, see U.S. Patent Publication No. 2011/0253837 published Oct. 20, 2011, U.S. Pat. No. 4,637,642 issued on Jan. 20, 1987 and U.S. Pat. No. 5,567,028 issued on Oct. 22, 1996, the entireties of which are hereby incorporated by reference.

SUMMARY OF THE PREFERRED EMBODIMENTS

Figure 1:
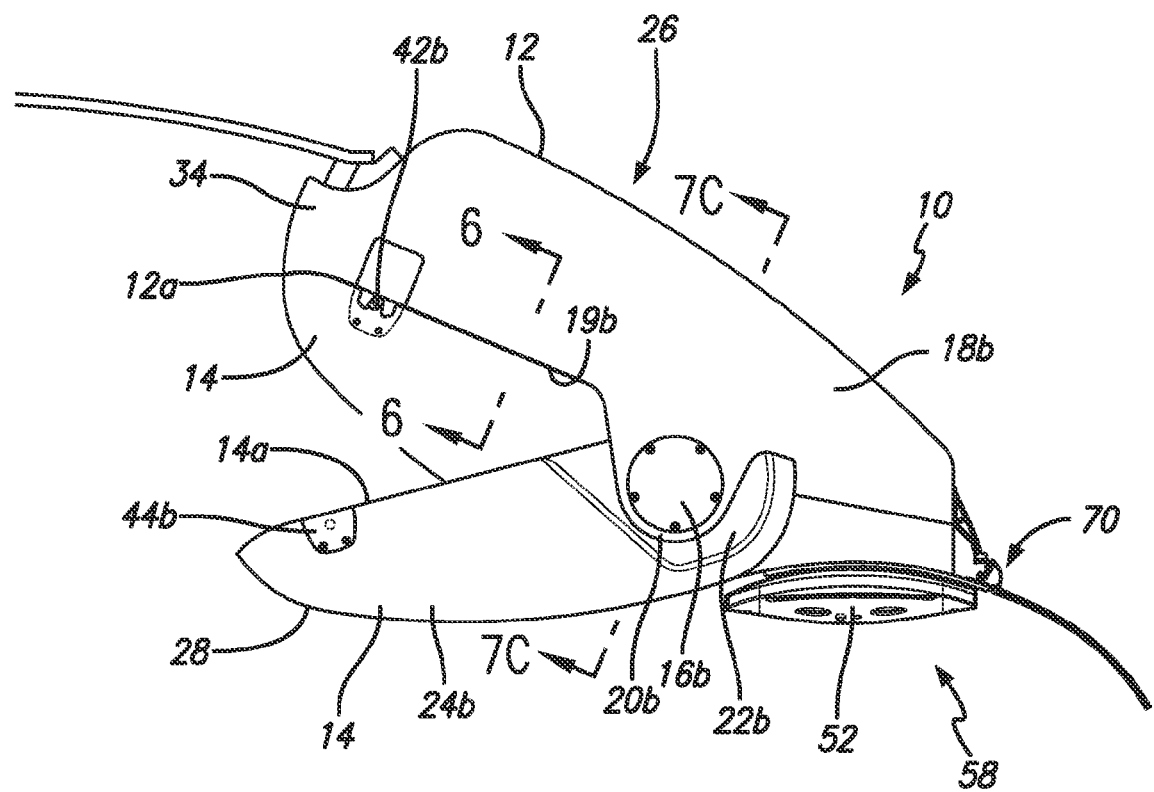
FIG. 1 is a side elevational view of two pivot bin assemblies in accordance with a preferred embodiment of the present invention showing a first pivot bin assembly in an open position and a second pivot bin assembly in a closed position.
Figure 2:
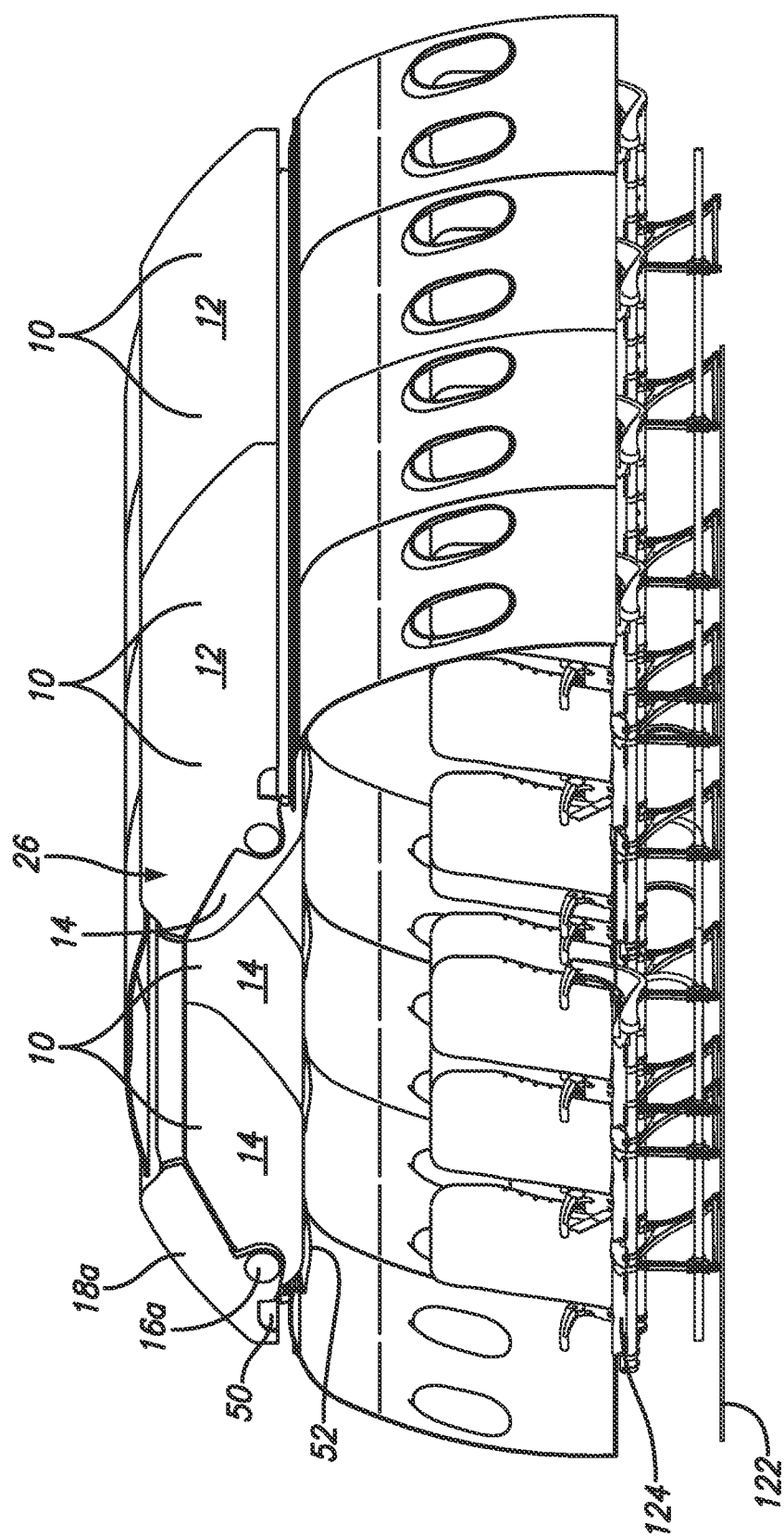
FIG. 2 is a perspective view of a portion of an aircraft cabin with a series of pivot bin assemblies installed therein.

In accordance with a first aspect of the present invention there is provided a pivot bin assembly that is configured to receive luggage and be positioned in the interior of an aircraft. The pivot bin assembly includes an upper housing that includes a strongback and first and second side panels, a bucket that cooperates with the upper housing to define a bin interior, a first pivot mechanism operatively associated with the first side panel and the bucket, and a second pivot mechanism operatively associated with the second side panel and the bucket. The first and second pivot mechanisms are axially aligned along and are rotatable about a pivot axis such that the bucket pivots about the pivot axis with respect to the upper housing between an open position and a closed position. In a preferred embodiment, the bucket includes a bottom and first and second opposing sides, and, when the pivot bin assembly receives luggage in the bin interior, the luggage is positioned on the bottom of the bucket, which bears the load of the luggage. The first and second side panels include a bottom edge and the first and second sides of the bucket include a top edge, and in the closed position, at least a portion of the top edge of the first side of the bucket abuts the bottom edge of the first side panel, and at least a portion of the top edge of the second side of the bucket abuts the bottom edge of the second side panel. Preferably, the bottom of the bucket includes a top edge that abuts a front bottom edge of the strongback when the bucket is in the closed position. The top edge of the bottom and sides of the bucket forms a generally continuous abutment edge that abuts the front bottom edge of the strongback and at least a portion of the bottom edge of the first and second side panels.

In a preferred embodiment, the first side panel includes a first ear extending downwardly therefrom and the second side panel includes a second ear extending downwardly therefrom, and the first side of the bucket includes a first indented portion that receives the first ear and the second side of the bucket includes a second indented portion that receives the second ear. The first pivot mechanism extends between the first ear and the first indented portion and the second pivot mechanism extends between the second ear and the second indented portion. In a preferred embodiment, in the closed position, in a direction generally parallel to the pivot axis, the first and second side panels do not overlap the first and second sides of the bucket. In another preferred embodiment, in the closed position, in a direction generally parallel to the pivot axis, the first and second side panels do not overlap the first and second sides of the bucket, except for where the first and second ears overlap with the first and second indented portions.

The pivot bin assembly further includes at least one latch assembly for securing the bucket to the upper housing in the closed position. In a preferred embodiment, the pivot bin assembly includes first and second latch assemblies and the first latch assembly is associated with the first side panel and the first side of the bucket, and the second latch assembly is associated with the second side panel and the second side of the bucket. Preferably, the first latch assembly includes a first hook portion and a first striker portion and the second latch assembly includes a second hook portion and a second striker portion. One of the first hook portion and the first striker portion is associated with the first side panel and the other of the first hook portion and the first striker portion is associated with the first side of the bucket and one of the second, hook portion and the second, striker portion is associated with the second side panel and the other of the second hook portion and the second, striker portion is associated with the second side of the bucket. In a preferred, embodiment, the first hook portion extends downwardly from the bottom edge of the first side panel and the first striker portion is positioned in a first recess defined in the top edge of the first side of the bucket, and the second hook portion extends downwardly from the bottom edge of the second side panel and the second striker portion is positioned in a second recess defined in the top edge of the second side of the bucket. In another preferred embodiment, the first hook portion extends upwardly from the top edge of the first side of the bucket and the first striker portion is positioned in a first recess defined in the bottom edge of the first side panel, and the second hook portion extends upwardly from the top edge of the second side of the bucket and the second striker portion is positioned in a second recess defined in the bottom edge of the second side panel. In a preferred embodiment, the first and second latch assemblies are in electrical communication with an operating member disposed on the bucket.

In a preferred embodiment, the first and second pivot mechanisms comprise first and second rotary dampers that damp the rotation of the first and second pivot mechanisms, respectively, when the bucket pivots to the open position. Preferably, the first rotary-damper is positioned in an opening in the first ear and a first pivot axle extends from the first rotary damper to the first side of the bucket, and the second rotary damper is positioned in an opening in the second ear and a second pivot axle extends from the second rotary damper to the second side of the bucket.

In a preferred embodiment, the upper housing includes a passenger service unit ("PSU") channel integral therewith that is positioned, adjacent to the bucket. Preferably, the PSU channel includes at least a first PSU pod extending downwardly therefrom. The upper housing includes first and second rails, and the PSU pod extends downwardly from a panel that includes first and second connectors that are secured to the first and second rails, respectively. Preferably, the PSU channel includes systems components disposed therein, and the PSU pod includes passenger components disposed therein. In a preferred embodiment, the upper housing includes an ECS channel integral therewith that is separate from the PSU channel.

In a preferred embodiment, the pivot bin assembly can fit therein four pieces of standard luggage. Each piece of standard luggage includes a top, a bottom, a front, a back and two sides and the four pieces of standard luggage are received in the bin interior and positioned such that one of the two sides of each piece of standard luggage is resting on the bucket bottom when the bucket is in the closed position. In a preferred embodiment, the bucket is made of a single piece that is created or formed on a mold in a single operation. Preferably, the bucket defines a lower portion of the bin interior and the upper housing defines an upper portion of the bin interior.

In accordance with another aspect of the present invention there is provided a pivot bin assembly that is configured to receive luggage and be positioned in the interior of an aircraft. The pivot bin assembly includes an upper housing that includes a strongback and first and second side panels, a bucket that cooperates with the upper housing to define a bin interior and is pivotally connected to the upper housing such that it pivots about a pivot axis with respect to the upper housing between an open position and a closed position. The bucket includes a bottom and first and second sides. The pivot bin assembly also includes first and second latch assemblies. The first latch assembly is associated with the first side panel and the first side of the bucket, and the second latch assembly is associated, with the second side panel and the second side of the bucket.

In accordance with another aspect of the present invention there is provided a pivot bin assembly that is configured to receive luggage and be positioned, in the interior of an aircraft. The pivot bin assembly includes an upper housing that includes a strongback and first and second side panels that each include a bottom edge, and a bucket that cooperates with the upper housing to define a bin interior and includes a bottom and first and second opposing sides. When the pivot bin assembly receives luggage in the bin interior, the luggage is positioned on the bottom of the bucket. The first and second sides of the bucket include a top edge and the bottom of the bucket includes a top edge. The pivot bin assembly also includes a first pivot mechanism operatively associated with the first side panel and the bucket, and a second pivot mechanism operatively associated with the second side panel and the bucket. The first and second pivot mechanisms are axially aligned along and rotatable about a pivot axis, and the bucket pivots about the pivot axis with respect to the upper housing between an open position and a closed position. When the bucket is in the closed position, the top edge of the bottom and sides of the bucket forms a generally continuous abutment edge that abuts the front bottom edge of the strongback and at least a portion of the first and second side panels. The pivot bin assembly also includes first and second latch assemblies for securing the bucket to the upper housing in the closed position. The first latch assembly includes a first hook portion and a first striker portion and the second latch assembly includes a second hook portion and a second striker portion. The first hook portion extends downwardly from the bottom edge of the first side panel and the first striker portion is positioned in a first recess defined in the top edge of the first side of the bucket. The second hook portion extends downwardly from the bottom edge of the second side panel and the second striker portion is positioned in a second recess defined in the top edge of the second side of the bucket. The first and second latch assemblies are in electrical communication with an operating member disposed on the bucket.

In accordance with another aspect of the present invention, there is provided a dual pivot bin assembly that includes first and second pivot bin assemblies as described above positioned adjacent one another, but that include a common strongback.

In accordance with another aspect of the present invention, there is provided an aircraft that comprises a cabin having a side wall, and that has at least first and second of the pivot bin assemblies described above that are connected to the side wall.

In accordance with another aspect of the present invention, there is provided a pivot bin assembly that is configured to receive luggage and be positioned in the interior of an aircraft. The pivot bin assembly includes an upper housing that includes first and second side panels and a strongback that includes an integral PSU channel formed therewith, a bucket that cooperates with the upper housing to define a bin interior, a first pivot mechanism operatively associated with the first side panel and the bucket, and a second pivot mechanism operatively associated with the second side panel and the bucket. The bucket pivots about the pivot axis with respect to the upper housing between an open position and a closed position. In a preferred embodiment, the strongback includes first and second rails that, when the pivot bin assembly is positioned in an aircraft, extend generally parallel to a longitudinally extending axis of the aircraft, and the pivot bin assembly includes at least one panel that is connected to the first and second rails and partially defines the PSU channel. Preferably, the at least one panel includes a PSU pod extending downwardly therefrom that includes reading lights disposed therein and has cabin lighting associated therewith.

DETAILED DESCRIPTION OF THE PREFERRED EMBODIMENTS

The following description and drawings are illustrative and are not to be construed, as limiting. Numerous specific details are described to provide a thorough understanding of the disclosure. However, in certain instances, well-known or conventional details are not described, in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed, herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-16 show a pivot bin assembly 10. In particular, the invention can be used on commercial passenger aircraft. However, this is not a limitation on the present invention and the pivot bin assembly 10 can be used elsewhere.

The present invention pivot bin assembly 10 employs a "clamshell design." In a preferred embodiment, the pivot bin assembly 10 allows as much of the entire volume inside the bin as possible to be used, increasing volume and baggage capacity when compared to the prior art. The design and structure also provides a way to integrate systems such as environmental control system ("ECS") ducting and electrical.

As will be appreciated by those skilled in the art, within the cabin of an aircraft, overhead stowage bins are typically secured to attachment points, such as hard points and overhead and side attachments. Accordingly, a description of the attachment of the pivot bin assembly will be omitted.

FIGS. 1-16 show a dual pivot bin assembly that is essentially two pivot bin assemblies 10 with a common strongback 12 and that can be installed together in the cabin of an aircraft. However, it will be understood by those of ordinary skill in the art, that a single and separate pivot bin assembly 10 with a single strongback 12 is within the scope of the present invention and is described and claimed herein. In another embodiment, more than two or multiple pivot bin assemblies 10 can include a common strongback 12. The figures show pivot bin assemblies 10 that are positioned outboard on the aircraft. However, it will be appreciated, that the pivot bin assembly 10 can be used inboard on a wide body aircraft. For example, two sets of back to back outboard facing pivot bin assemblies 10 can include a common strongback 12.

In a preferred embodiment, the pivot bin assembly 10 includes the strongback 12, a tray or bucket 14 with a first and a second pivot mechanism or pivot axle 16a and 16b on each side, and first and second side panels 18a and 18b. With respect to each pivot bin assembly 10, the strongback 12 and first and second side panels 18a and 18b are referred to herein together as the upper housing 26. Generally, the pivot bin assembly 10 includes the upper housing 26, which includes the strongback 12 and the first and second side panels 18a and 18b, and the bucket 14. The bucket 14 and upper housing 26 cooperate to define a bin interior 36. In a preferred embodiment, the bucket 14 defines the lower portion of the bin interior 36 and the upper housing defines the upper portion of the bin interior 36.

In the embodiment shown in the figures, the strongback 12 and first and second side panels 18a and 18b are separate components. However, in another embodiment, the strongback 12 and first and second side panels 18a and 18b (the upper housing 26) can be a unitary component. In a preferred embodiment, the pivot bin assembly 10 includes a single piece bucket 14 that includes a bottom 28 and first and second opposing sides 24a and 24b. In another embodiment, the bucket 14 can include multiple pieces, e.g., a three piece design that includes the bottom 28 and first and second opposing sides 24a and 24b as separate components. It will be appreciated by those of ordinary skill in the art that the bucket 14 and upper housing 26 provide a "clamshell design," where at least a portion of the bottom edge 19a of the first side panel 18a and the bottom edge 19b of the second side panel 18b and the front bottom edge 12a of the strongback 12 meet edge to edge with or abut the top edge 14a of the bucket 14. In a preferred embodiment, in the closed position, other than the rear top edge 28b of the bottom 28 of the bucket 14 and the area adjacent thereto and the strongback 12 (see FIG. 8), there is little to no overlap between the bucket 14 and the upper housing 26. In a preferred embodiment, other than the localized overlap between the first and second ears 20a and 20b and the first and second indented portions 22a and 22b, in the closed position, there is no overlap between the first and second side panels 18a and 18b and the first and second sides 24a and 24b of the bucket 14. In other words, in a preferred embodiment, the bucket 14 does not enter the upper portion of the bin interior 36, which is defined by the upper housing 26, when the bucket 14 is pivoted to the closed position. It will be appreciated by those skilled in the art, that not only does this increase stowage volume and reduce weight by eliminating redundant paneling, but also significantly decreases the number of parts needed for the entire pivot bin assembly 10, compared to the prior art. As shown in the figures, the strongback 12 can include an integral valence 34 for lighting, ducting and/or other system components that can be generally hidden from passenger view. In a preferred embodiment, the valence 34 is formed as a unitary portion of the strongback 12. However, this is not a limitation on the present invention and the valence 34 can be omitted. As will be appreciated by those skilled in the art, within the cabin of an aircraft, overhead stowage bins are typically secured to attachment points, such as hard points and overhead and side attachments. Accordingly, a detailed description of the attachment of the pivot bin assembly will be omitted.

When the bucket 14 is pivoted to the closed position, the first and second sides 24a and 24b of the bucket 14 are not received in the upper portion of the bin interior 36. In other words, in the portion of the first and second side panels 18a and 18b that do not include the first and second ears 20a and 20b and first and second indented portions 22a and 22b, the first and second top edges 25a and 25b do not pass or overlap with the first and second bottom edges 19a and 19b when the bucket 14 is pivoted to the closed position. Preferably, the first and second top edges 25a and 25b and first and second bottom edges 19a and 19b abut one another. However, an embodiment is possible where the first and second top edges 25a and 25b and first and second bottom edges 19a and 19b are horizontally separated from one another, but, in a vertical direction, the first and second top edges 25a and 25b do not pass or overlap with the first and second bottom edges 19a and 19b when the bucket 14 is pivoted to the closed position.

In a preferred embodiment, the strongback 12, bucket 14 and first and second side panels 18a and 18b are made out of crush-core panel. However, this is not a limitation on the present invention and other materials can be used. In an exemplary embodiment, the single piece bucket 14 is made using crush core match metal molding. This creates a continuous composite structure with a C-frame cross section that can be made from a single mold. The continuous piece acts as a structural I-beam. However, this structure is not a limitation on the present invention.

Figure 8:
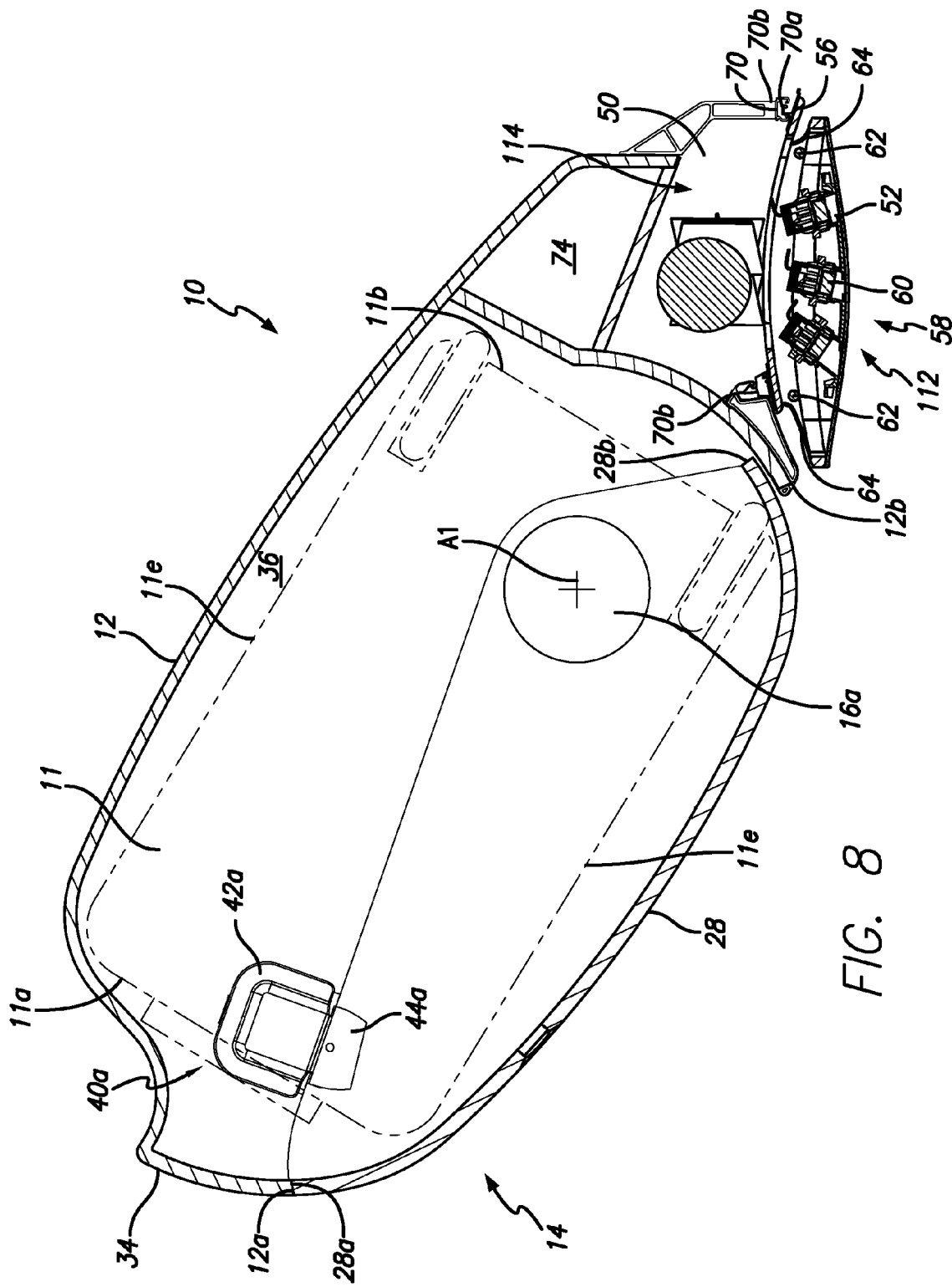
FIG. 8 is a cross-sectional view of one of the pivot bin assemblies of FIG. 1 and showing how a standard piece of luggage fits therein.
Figure 9:
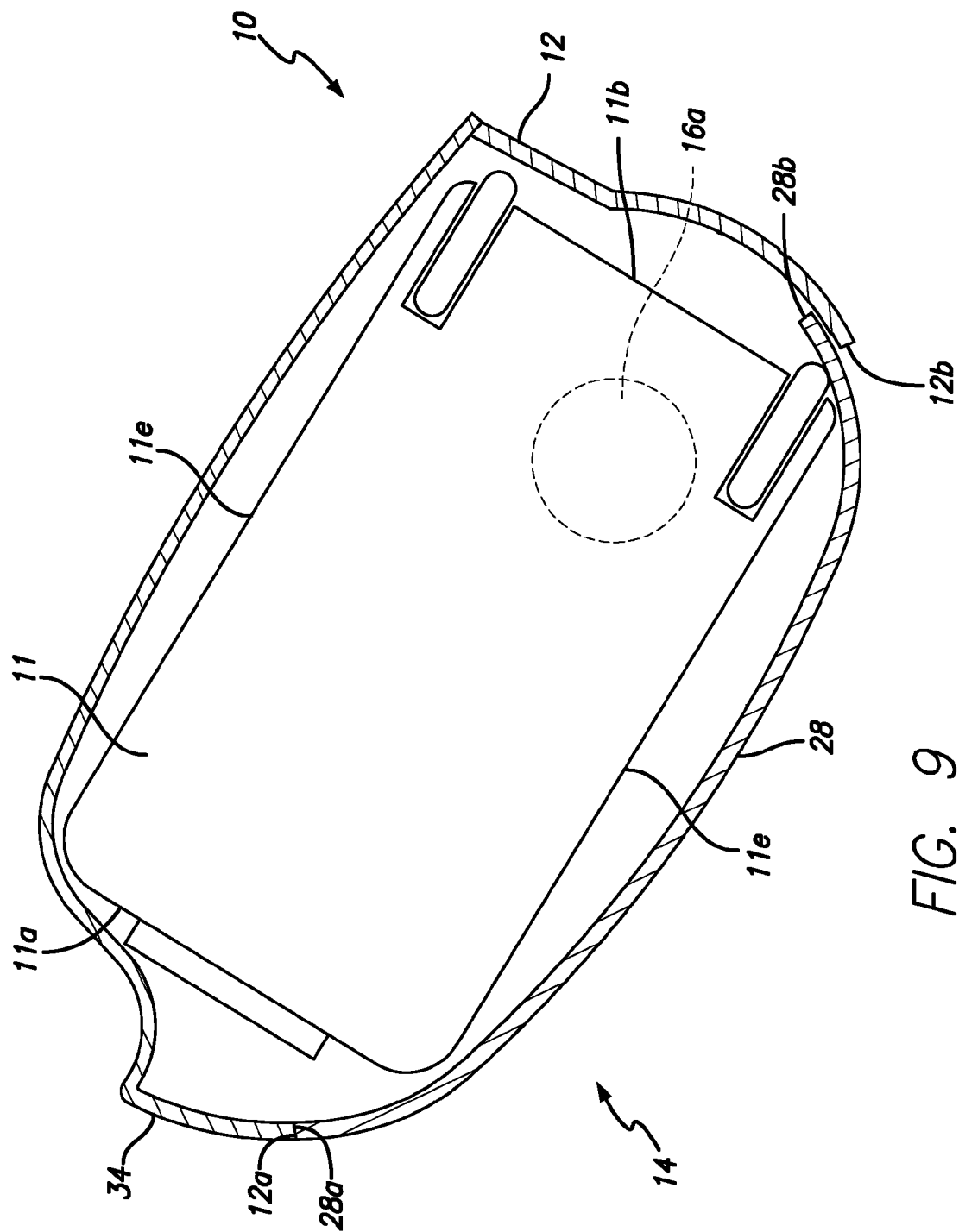
FIG. 9 is a cross-sectional view of one of the pivot bin assemblies of FIG. 1 with the PSU channel omitted.
Figure 10:
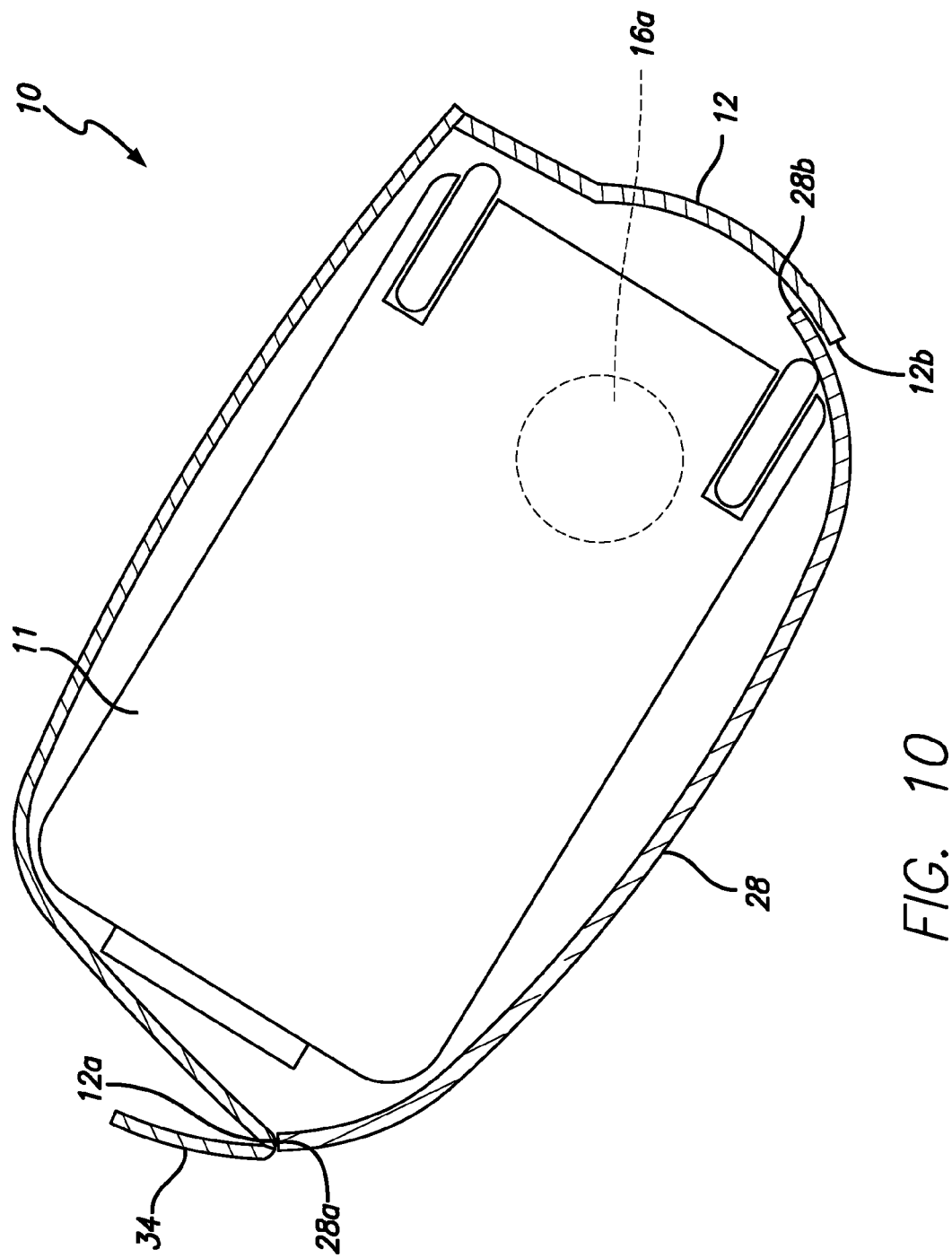
FIG. 10 is a cross-sectional view of a pivot bin assembly with a different valence.
Figure 11:
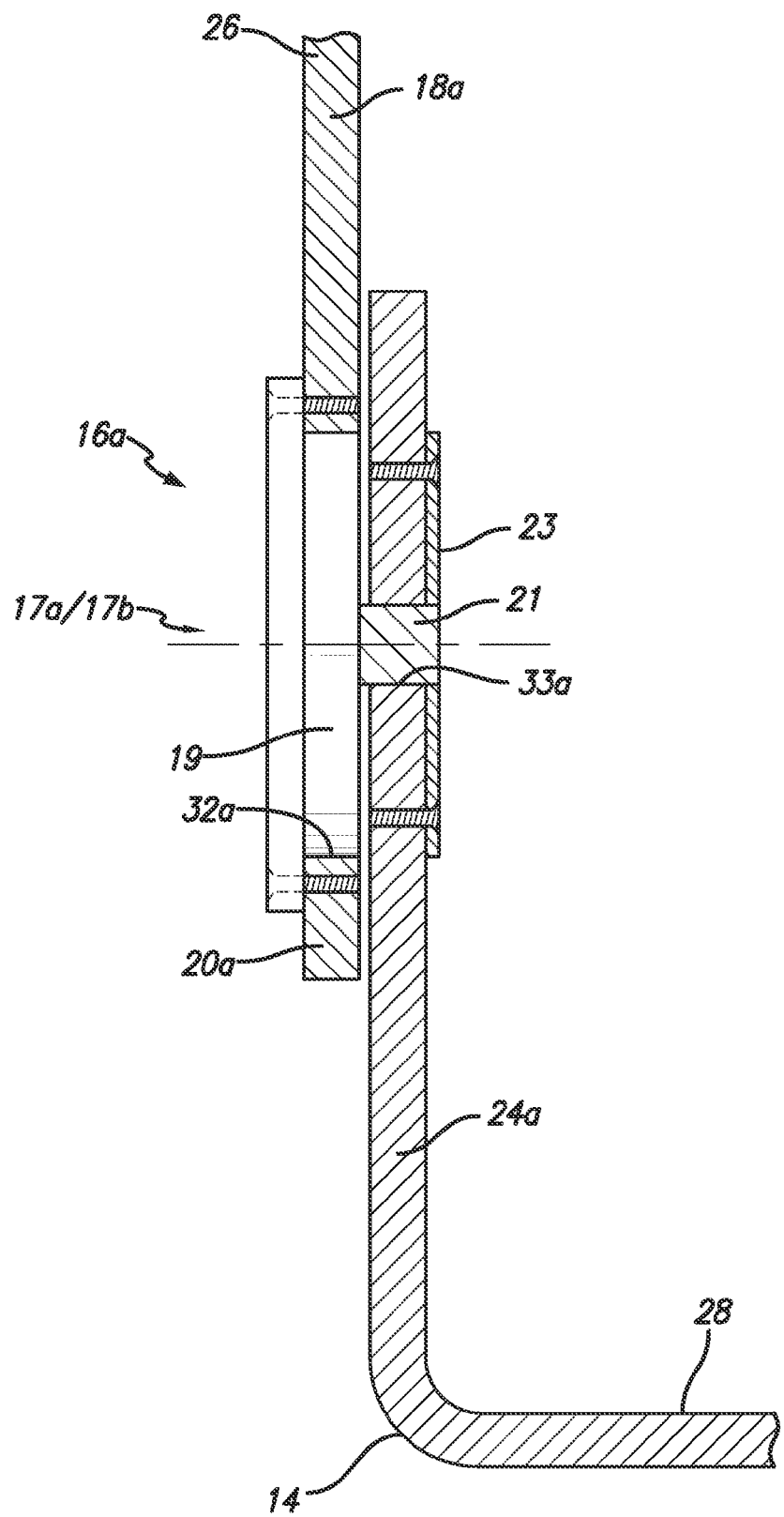
FIG. 11 is a detailed cross-sectional view showing a rotary damper pivot mechanism providing the pivot point between the side panel and the bucket.
Figure 12:
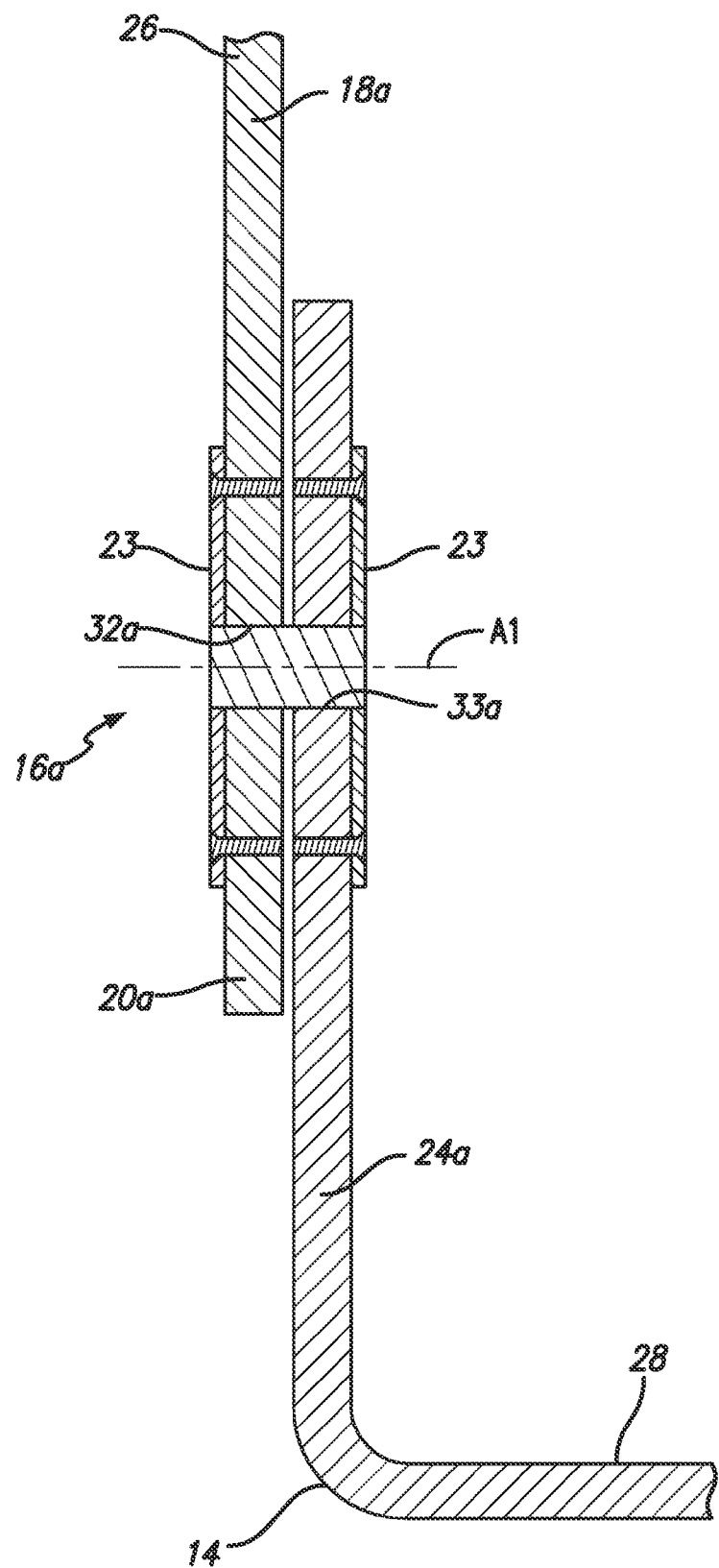
FIG. 12 is a detailed cross-sectional view showing a pivot axle as the pivot mechanism providing the pivot point between the side panel and the bucket.

As shown in FIGS. 1-12, generally, first and second side panels 18a and 18b include first and second pivot mechanisms 16a and 16b that are operatively associated with the bucket 14, and allow the bucket 14 to pivot with respect to the upper housing 26 between an open position and a closed position. Any type of pivot mechanism that allows the bucket 14 to pivot with respect to the upper housing 26 is within the scope of the present invention. For example, the first and second pivot mechanisms 16a and 16b can be pivot axles, as shown in FIG. 12. It will be appreciated that the first and second pivot mechanisms 16a and 16b or axles pivot or rotate about a pivot axis. In a preferred embodiment, the first and second pivot mechanisms 16a and 16b are axially aligned such that the pivot axles rotate about the same axis A1, as shown in FIGS. 7C and 8.

In a preferred embodiment, the first side panel 18a includes a first ear 20a and the second side panel 18b includes a second ear 20b extending downwardly therefrom. The first and second ears 20a and 20b mate with or are received in first and second indented portions 22a and 22b that are formed in the first and second sides 24a and 24b of the bucket 14. As shown in the figures, preferably, the first and second indented portions 22a and 22b extend inwardly into the interior of the bucket 14. However, in another embodiment, the indented portions can extend outwardly. Furthermore, in another embodiment, the ears can extend upwardly from the bucket and the indented portions can be defined inwardly or outwardly on the side panels of the upper housing.

Figure 6:
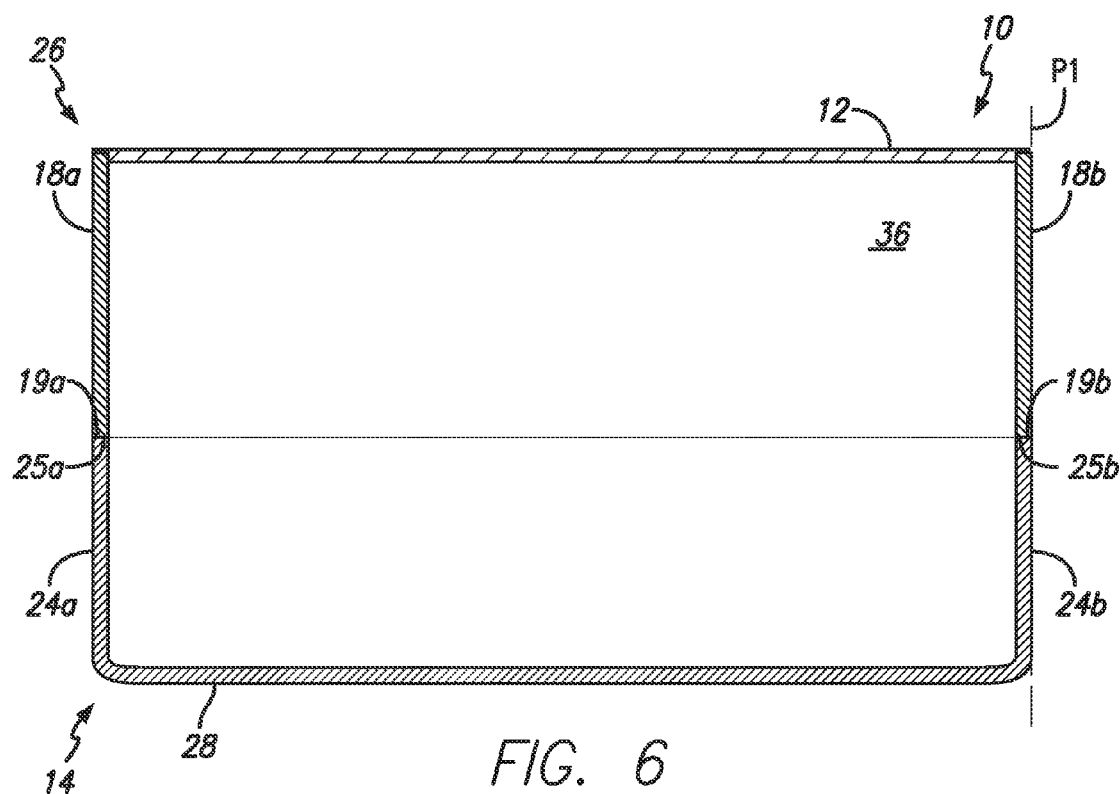
FIG. 6 is a cross-sectional view taken along line 6-6 of FIG. 1.
Figure 7A:
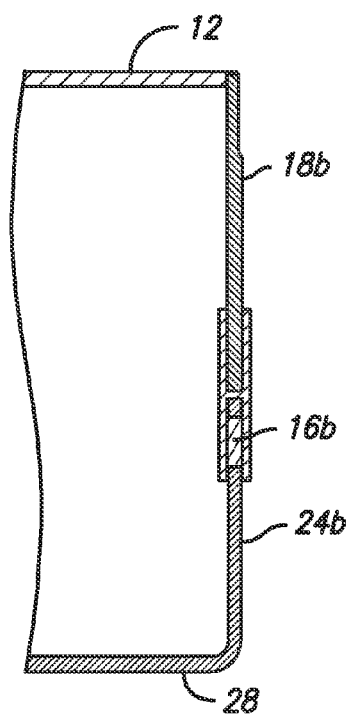
FIG. 7A is a cross-sectional view taken along the same line as FIG. 6, but showing an alternative embodiment for securing the bucket to the upper housing.
Figure 7B:
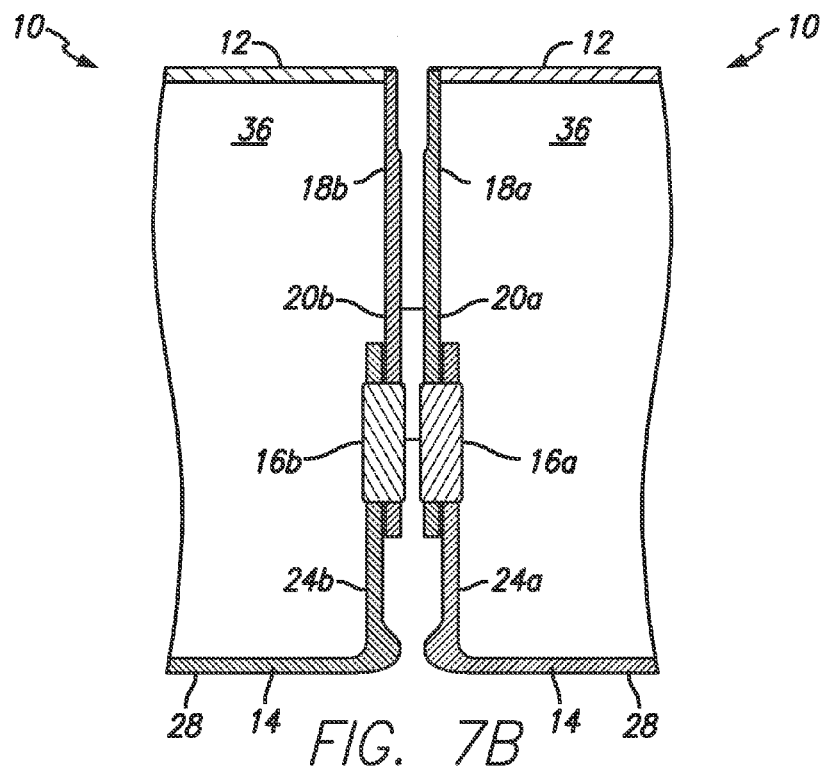
FIG. 7B is a cross-sectional view of a portion of the pivot bin assemblies of FIG. 1.
Figure 7C:
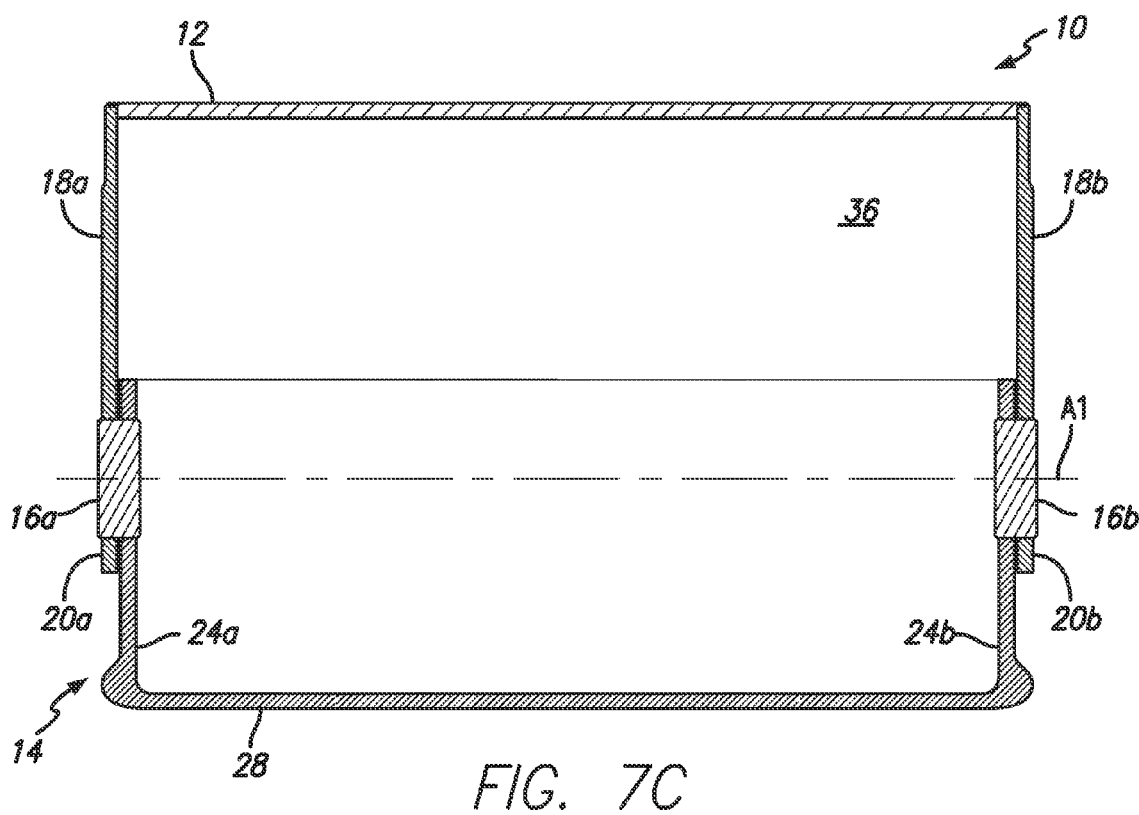
FIG. 7C is a cross-sectional view taken along line 7C-7C of FIG. 1.

In a preferred embodiment, the first side panel 18a, first ear 20a and the first side 24a of the bucket 14 (other than the first indented, portion 22a) all are positioned in a generally common plane PI (see FIG. 6). Likewise, the second, side panel 18b, second ear 20b and the second side 24b of the bucket 14 (other than the second indented portion 22b) all are positioned in a generally common plane. In another embodiment, the first and second ears 20a and 20b can be part of the bucket 14 and the first and second indented portions 22a and 22b can be defined in the first and second side panels 18a and 18b.

Figure 3:
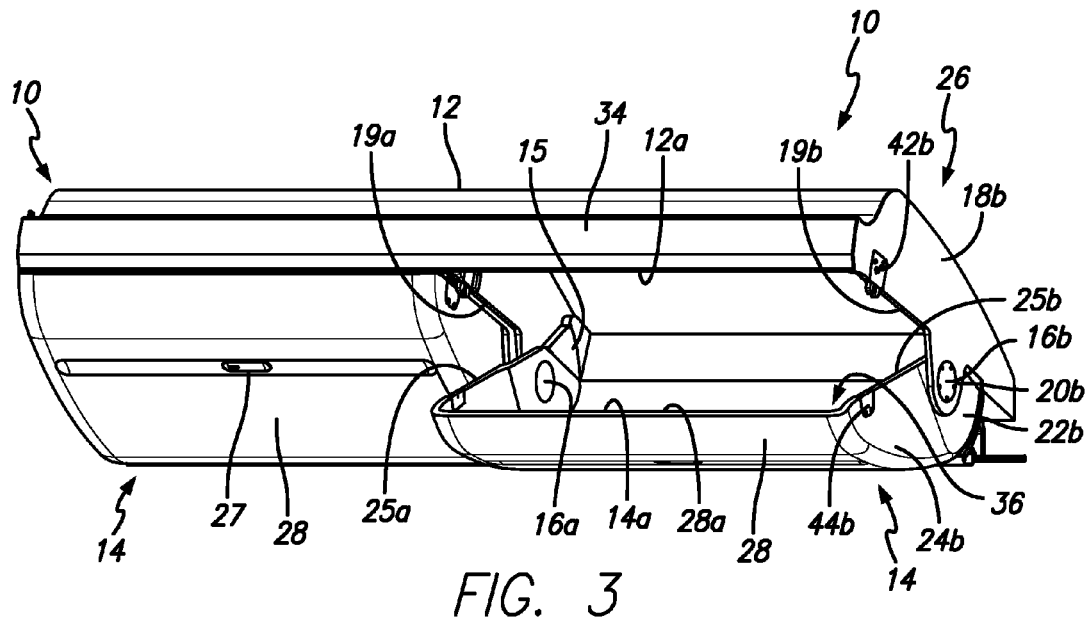
FIG. 3 is a perspective view of the pivot bin assemblies of FIG. 1.
Figure 14:
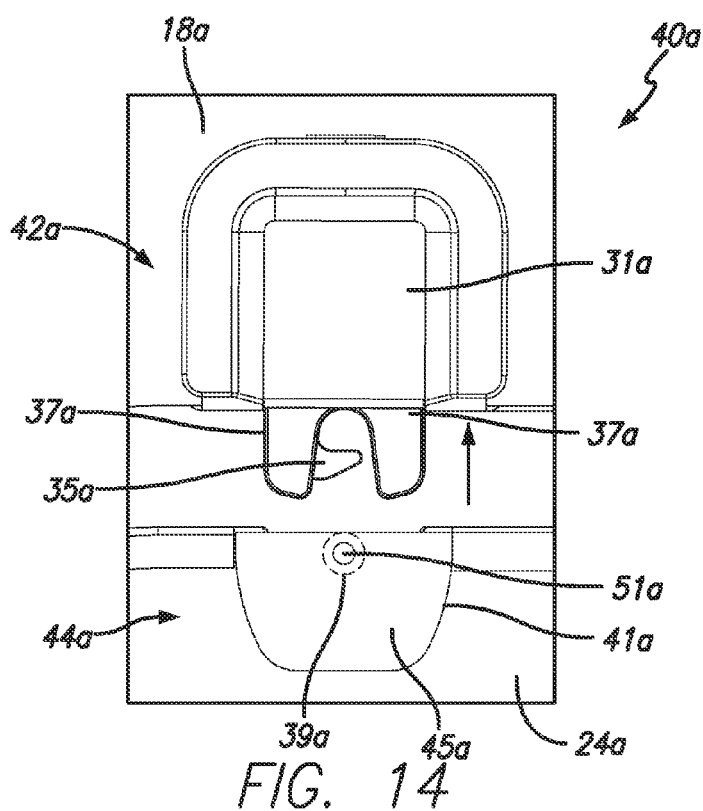
FIG. 14 is an elevational view showing the first latch assembly in the unlatched position.

As discussed above, and as shown in FIGS. 6 and 8, in a preferred embodiment, in the closed position, the bottom edges of the first and second side panels 18a and 18b abut the top edges 25a and 25b of the first and second sides 24a and 24b of the bucket 14 (FIG. 6) and the front bottom edge 12a of the strongback 12 abuts the front top edge 28a of the bottom 28 of the bucket 14 (FIGS. 8 and 14). As is also shown in FIGS. 8 and 14, the bottom 28 of they bucket 14 includes a rear top edge 28b that is positioned adjacent to but does not abut a rear bottom edge 12b of the strongback 12. This allows a portion of the bottom 28 of the bucket to overlap with the strongback 12 when the bucket 14 pivots to the open position. It will be appreciated by those skilled in the art that in a commercial embodiment, the bucket and/or upper housing may include edge trim, seals or the like that cover the top edges of the bucket or the bottom edges of the upper housing. However, this is not a limitation on the present invention and any such components are considered part of the upper housing or bucket for purposes of the claims appended hereto. In a preferred embodiment, the pivot bin assembly 10 includes at least one stop member 15 (and preferably a plurality of stop members) positioned within the bin interior 36 and that maintains the bucket 14 in the open position and prevents it from pivoting too far. Any type of stop member 15 is within the scope of the present invention. For example, as shown in FIG. 3, the stop member 15 can abut the angled top edge 14b of the back of the bucket 14 and/or the rear top edge 28b of the bottom 28 of the bucket 28. The stop member 15 can be a separate component or be built in to the upper housing 26 (e.g., a ledge).

In a preferred embodiment, the first pivot mechanism 16a extends between the first ear 20a and the first side 24a of the bucket 14 and the second, pivot mechanism 16b extends between the second ear 20b and second first side 24b of the bucket 14. As discussed above, the first and second pivot mechanisms can be pivot axles on which the bucket 14 can rotate. As shown in FIGS. 5-6 and 7B-7C, a portion of the first pivot mechanism 16a can be positioned in corresponding openings 32a and 33a in the first ear 20a and first side 24a, respectively, and a portion of the second pivot mechanism 16b can be positioned in corresponding openings 32b and 33b in the second ear 20b and second side 24b, respectively. In another embodiment, a pivot axle can extend from the bucket and into an opening in the ear or vice versa. Any pair of pivot mechanisms that are axially aligned and that allow the bucket 14 to pivot with respect to the upper housing 26 is within the scope of the present invention.

As shown in FIG. 11, in a preferred embodiment, the first and second pivot mechanism comprise first and second rotary dampers 17a and 17b. With respect to the first rotary damper 17a, one of the housing 19 or the axle 21 is secured within opening 32a and the other is secured within opening 33a. With respect to the second rotary damper 17b, one of the housing 19 or the axle 21 is secured within opening 32b and the other is secured within opening 33b. It will be appreciated that FIG. 11 only shows the first rotary damper 17a, but that second rotary damper 17b is a mirror image thereof. The first and second rotary dampers 17a and 17b can include covers 23 to secure them in place.

It will be understood that the first and second rotary dampers 17a and 17b provide the ability to damp or control the descent or pivoting of the bucket when it pivots to the open position. In a preferred embodiment, the first and second rotary dampers can be the rotary damper taught in U.S. Patent Publication No. 2013/0207529 the entirety of which is incorporated by reference. In another embodiment, the first and second rotary dampers can be the rotary damper taught in U.S. Patent Publication No. 2013/0209221 the entirety of which is incorporated by reference. In another embodiment, each of the first and second side panels 18a and 18b can include a cover 23 positioned on the outside or the inside of the bin interior 36 and that secures the first and second side panels 18a and 18b to the bucket 14 and that covers and houses the first and second pivot mechanism 16a and 16b. It will be appreciated that any type of power assist (for raising or lowering the bucket) or damper is within the scope of the present invention. For example, the present invention can utilize a prior art damper, such as a linear damper that includes a cylinder with a piston and damping fluid therein or a spring for assist, as is known in the art.

Figure 4:
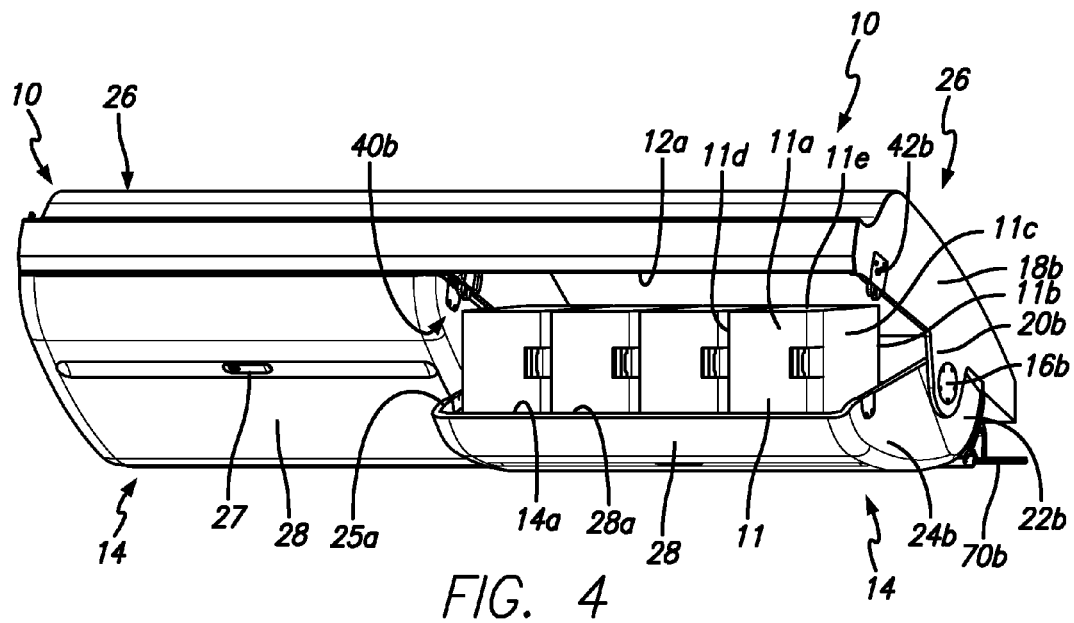
FIG. 4 is a perspective view of the pivot bin assemblies of FIG. 1 with luggage therein.
Figure 5:
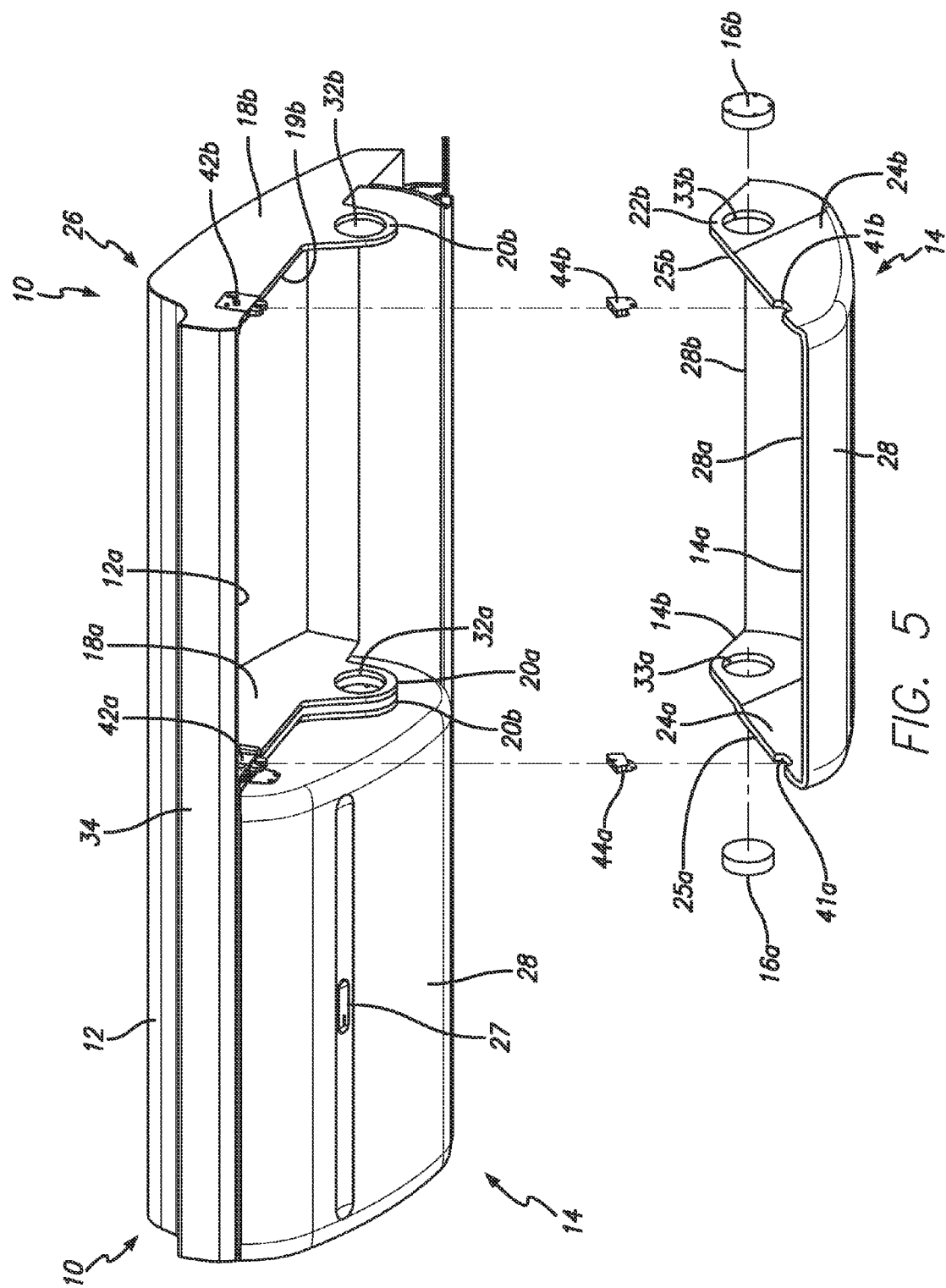
FIG. 5 is a perspective view of the pivot bin assemblies of FIG. 1 with one of the buckets exploded therefrom.
Figure 13:
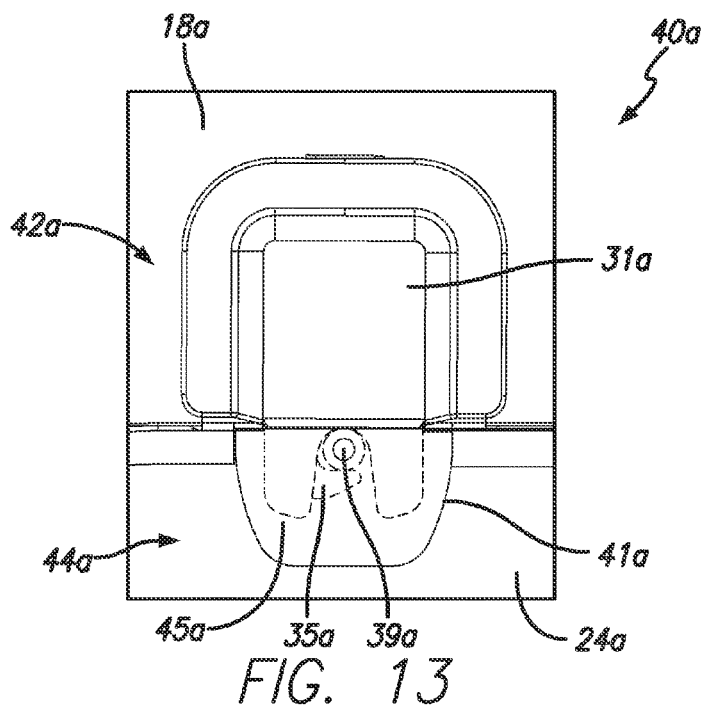
FIG. 13 is an elevational view showing the first latch assembly in the latched position.
Figure 15:
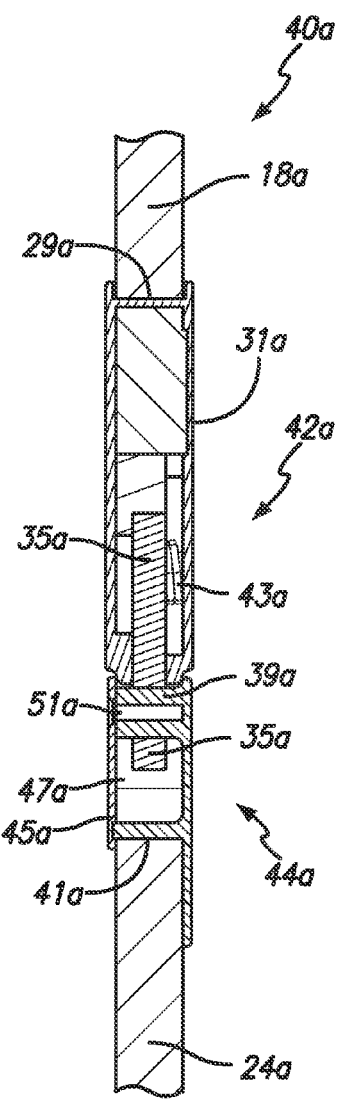
FIG. 15 is a cross-sectional view of the first latch assembly in the latched position.
Figure 16:
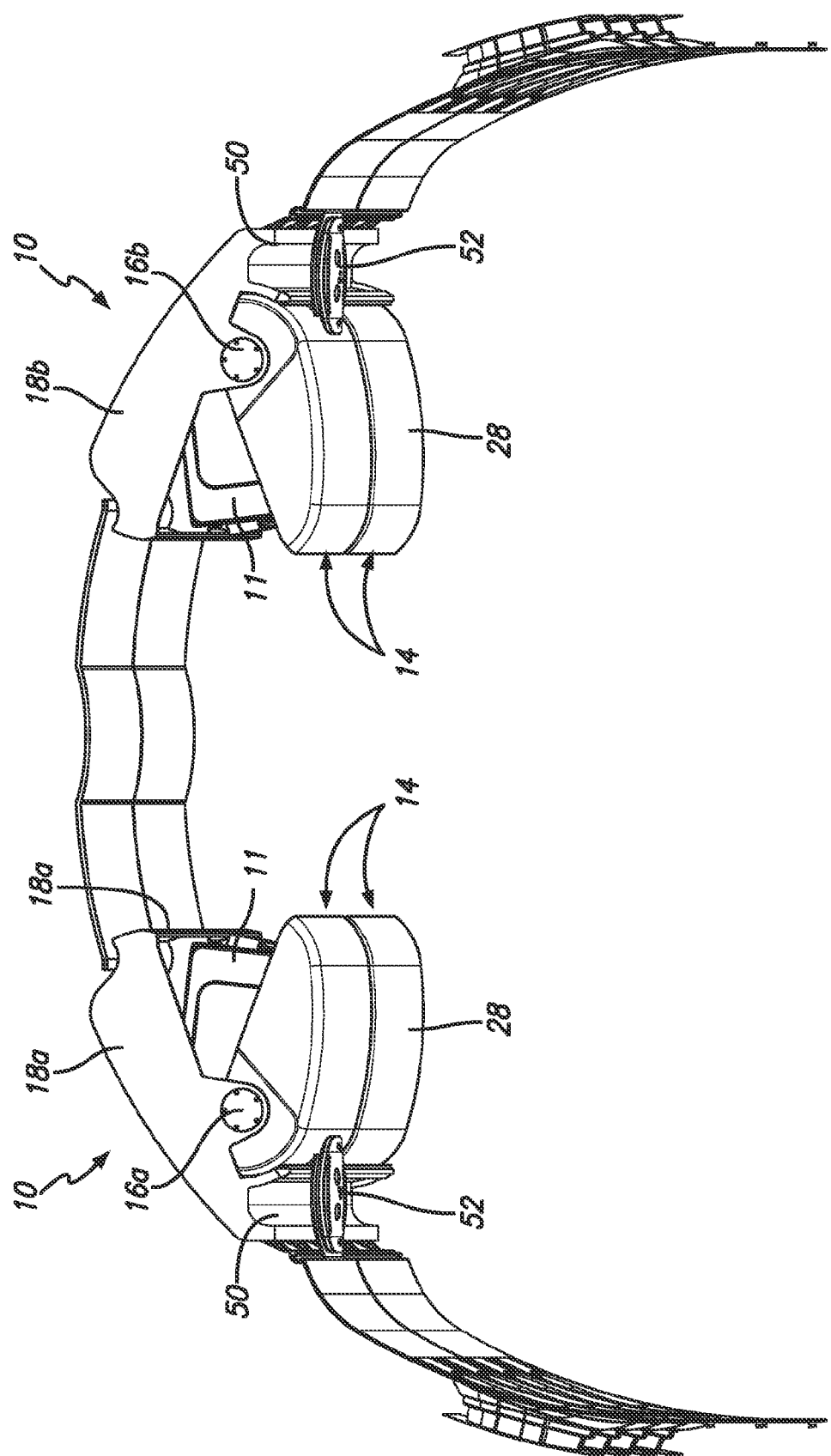
FIG. 16 is a perspective view of a portion of an aircraft cabin showing a plurality of pivot bin assemblies and PSU pods installed therein and showing an empty PSU channel.

As shown in FIGS. 1-5 and, more specifically in FIGS. 13-15, in a preferred embodiment, the pivot bin assembly 10 includes first and second latch assemblies 40a and 40b operatively associated with the first and second side panels 18a and 18b and the first and second sides 24a and 24b of the bucket 14. Preferably, the first latch assembly 40a includes a first hook portion 42a and a first striker portion 44a and the second latch assembly 40b includes a second hook portion 42b and a second striker portion 44b. In a preferred embodiment, the first hook portion 42a extends downwardly from the bottom edge 19a of the first side panel 18a and the first striker portion 44a is positioned in a first recess 41a defined in the top edge 25a of the first side 24a of the bucket 14 and the second hook portion 42b extends downwardly from the bottom edge 19b of the second side panel 18b and the second striker portion 44b is positioned in a second recess 41b defined in the top edge 25b of the second side 24b of the bucket 14. In another embodiment, the first hook portion 42a extends upwardly from the top edge 25a of the first side 24a of the bucket 14 and the first striker portion 44a is positioned in a first recess defined in the bottom edge of the first side panel 18a, and the second hook portion 42b extends upwardly from the top edge 25b of the second side 24b of the bucket 14 and the second striker portion 44b is positioned in a second recess defined in the bottom edge of the second side panel 18b. In another preferred embodiment, the first striker portion 44a extends downwardly from the bottom edge 19a of the first side panel 18a and the first hook portion 42a is positioned in a first recess 41a defined in the top edge 25a of the first side 24a of the bucket 14 and the second striker portion 44b extends downwardly from the bottom edge 19b of the second side panel 18b and the second hook portion 42b is positioned in a second recess 41b defined in the top edge 25b of the second side 24b of the bucket 14. In another embodiment, the first striker portion 44a extends upwardly from the top edge 25a of the first side 24a of the bucket 14 and the first hook portion 42a is positioned in a first recess defined in the bottom edge of the first side panel 18a, and the second striker portion 44b extends upwardly from the top edge 25b of the second side 24b of the bucket 14 and the second hook portion 42b is positioned in a second recess defined in the bottom edge of the second side panel 18b. The first and second latch assemblies 40a and 40b can be actuated manually or electronically. As shown in FIG. 5, the pivot bin assembly 10 preferably includes an operating member 27 disposed on the bucket 14. In a preferred embodiment, the operating member 27 comprises a switch that is in electrical communication (with wires or wirelessly) with the first and second latch assemblies 40a and 40b.

It will be appreciated, that any type of latching mechanism that allows the bucket 14 to connect to the upper housing 26 is within the scope of the present invention. Furthermore, it will be appreciated that the terms first hook portion and second hook portion refer to the entire assembly secured to the upper housing in the figures. And, the terms first striker portion and second striker portion refer to the entire assembly secured, to the upper housing in the figures. The hook portion can be any latching mechanism that includes a hook or latch that mates with or latches to a striker. FIGS. 13-15 show an exemplary embodiment of the first latch assembly 40a. It will be understood that the second latch assembly 40b includes essentially the same components. FIGS. 13 and 15 show the first latch assembly 40a in the latched position and FIG. 14 shows the first latch assembly 40a in the unlatched position. Preferably, the first hook portion 42a is mounted in a recess 29a in the first side panel 18a and includes a housing 31a, a hook 35a and guide members 37a that help guide the striker 39a (which can be secured in place by a threaded fastener 51a) into the desired position. As is known in the art, the hook 35a can be mounted on a pivot pin and include a spring 43a for urging it into the desired position. Preferably the first striker portion 44a includes a housing 45a that defines a guide recess 47a defined therein and that is spanned by the striker 39a. In use, when the bucket 14 is pivoted to the closed position, the guide members 37a are received in the guide recess 47a, and, as a result of the angle on the bottom edge of the hook 35a and the round shape of the striker 39a, the hook 35a is pivoted out of the way and the striker 39a is received fully between the guide members 37a. As a result of the spring 43a, the hook 35a is urged into the position shown in FIG. 13, and the first latch assembly 40a is now in the latched position.

It will be appreciated, by those skilled in the art that by the first and second hook portions 42a and 42b extending downwardly from the first and second side panels 18a and 18b and latching to first and second striker portions 44a and 44b, which are essentially embedded in the first and second sides 24a and 24b of the bucket 14 allows the top edge 14a of the bucket 14 (i.e., top edges 25a and 25b and front top edge 28a to abut the bottom edge (bottom edges 19a and 19b and front bottom edge 12a) of the upper housing 26. In other words, the first side panel 18a, the first side 24a of the bucket 14 and the first latch assembly 40a are all lined up generally vertically and the second side panel 18b, the second side 24b of the bucket 14 and the second latch assembly 40b are all lined up generally vertically.

The first and second latch assemblies 40a and 40b shown in the figures are not a limitation on the present invention and any type of latch assembly or mechanism for securing the bucket 14 to the upper housing 26 is within the scope of the present invention. For example, the pivot bin assembly can include a center latch that connects the bucket to the strongback.

As shown in FIGS. 4, 8, 9, 10 and 16, the inventive pivot bin assembly 10 is designed to stow standard Travel Pro 22" bags or luggage 11 wheels first on their edge (this type of bag is referred to herein as "standard luggage"). As will be understood by those of ordinary skill in the art, storage of a maximum amount of luggage within overhead stowage bins is of utmost importance in passenger aircraft and the standard luggage discussed herein is used as an industry standard when determining the amount of cargo that will fit into overhead stowage bins. As shown in FIG. 4, a piece of standard luggage 11 includes a top 11a, a bottom 11b, a front 11c, a back 11d and two sides 11e. Typically, the standard luggage 11 includes wheels on the bottom 11b thereof. In a preferred embodiment of the present invention, a pivot bin assembly 10 can stow up to four pieces of standard luggage within the bin interior. However, this is not a limitation on the present invention. In another embodiment, the present invention can store more or less standard luggage.

In a preferred embodiment, the pivot axis A1 or pivot point provided by the first and second pivot mechanisms 16a and 16b is not along the same lengthwise axis as the luggage stored within the bin interior, but is instead non-centrally located. Furthermore, the center of gravity of the luggage in the bin interior is moved, outboard when compared to the prior art and closer to the pivot axis A1, thereby making the bucket 14 easier to close. Furthermore, compared to prior art pivot bins, the pivot bin assembly 10 can be moved further outboard from the aisle, thereby providing more passenger space and an open cabin feel. However, none of the statements that include comparisons to the prior art are intended to be a limitation on the present invention.

Figure 19A:
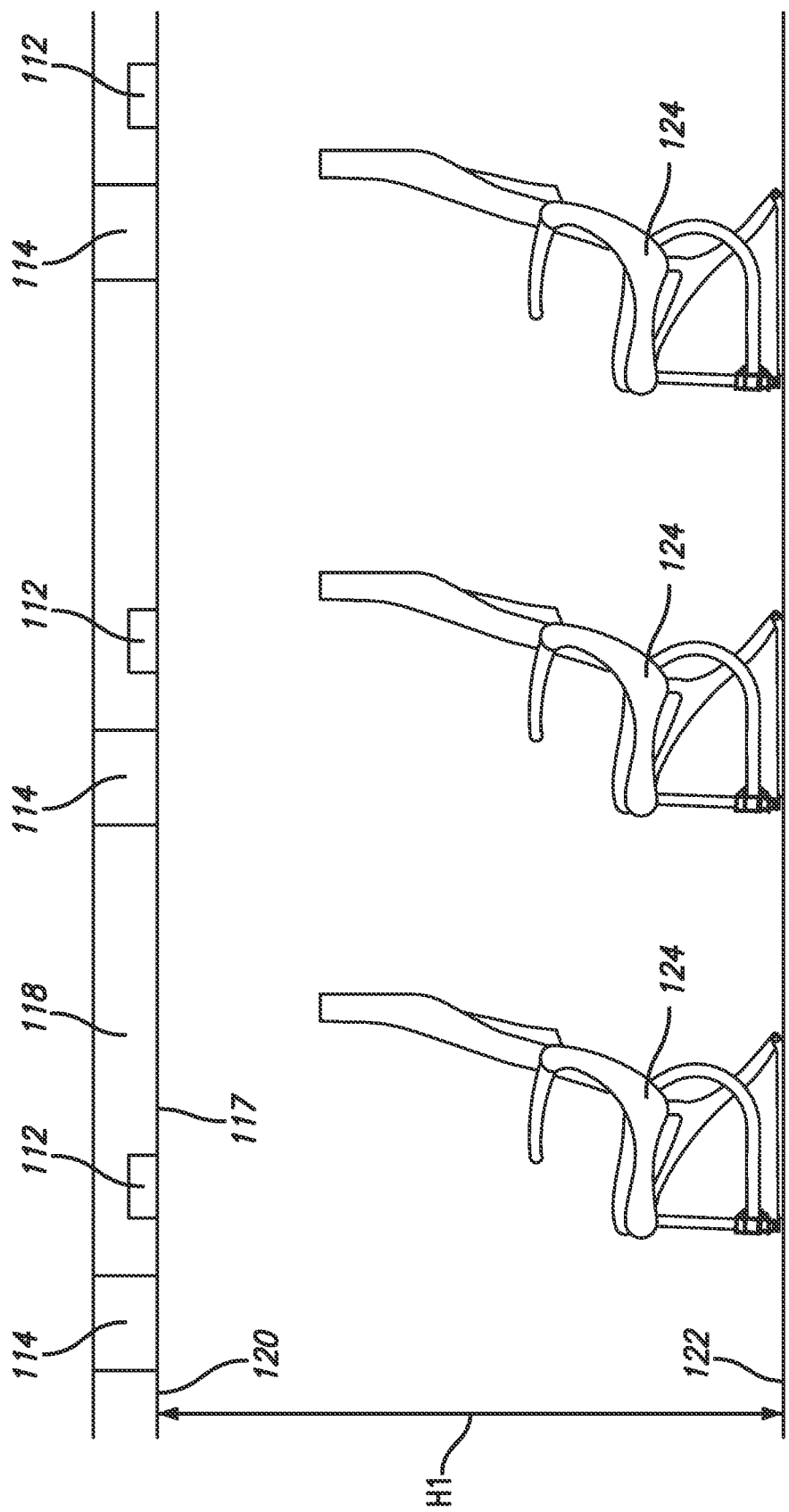
FIG. 19A is a side schematic view of a portion of a prior art aircraft showing a series of seats with the passenger components and system components located thereabove in the PSU channel.
Figure 19B:
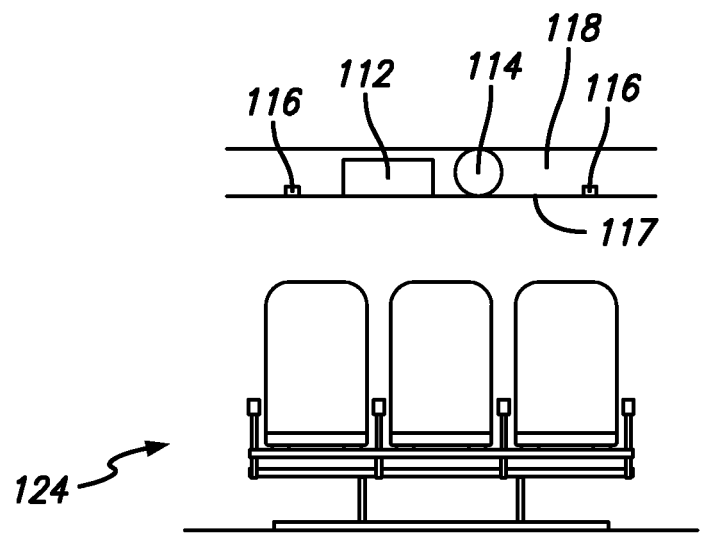
FIG. 19B is an end schematic view of a portion of a prior art aircraft showing a series of seats with the passenger components and system components located thereabove in the PSU channel.

With reference to FIGS. 19A-19B, as will be appreciated by those of ordinary skill in the art, passenger aircraft typically include what is referred to as a passenger service unit ("PSU"), which is situated generally above each seat row (although not typically at the same pitch with respect to each seat row) in the overhead panel above the passenger seats in the cabin of airliners. Amongst other things a PSU contains reading lights, loudspeakers, illuminated signs and automatically deployed oxygen masks and also gaspers providing conditioned air. Passenger service units typically include individual PSU panels 117 that are specialized for each function (e.g., speaker panels, reading light panels, spacer panels, etc.) and that are positioned on rails 116 that run the length of the interior of the cabin. These individual functional specific panels are then configured to meet the aircraft and passenger needs, typically resulting in the configuration and installation of three hundred or more specialized panels. These panels 117 are installed within and cover a PSU channel 118 that is filled with both passenger elements 112 (e.g., reading lights, gaspers, flight attendant buttons, etc.) and systems elements 114 (wiring, oxygen tanks/components, cabin lights and associated electronics, ducting, etc.) creating a ceiling 120 above the passenger that restricts\bounds the passenger's head room. As shown in FIG. 19A, there is a fixed, distance or height H1 from the floor 122 to the "ceiling" 120.

Figure 17A:
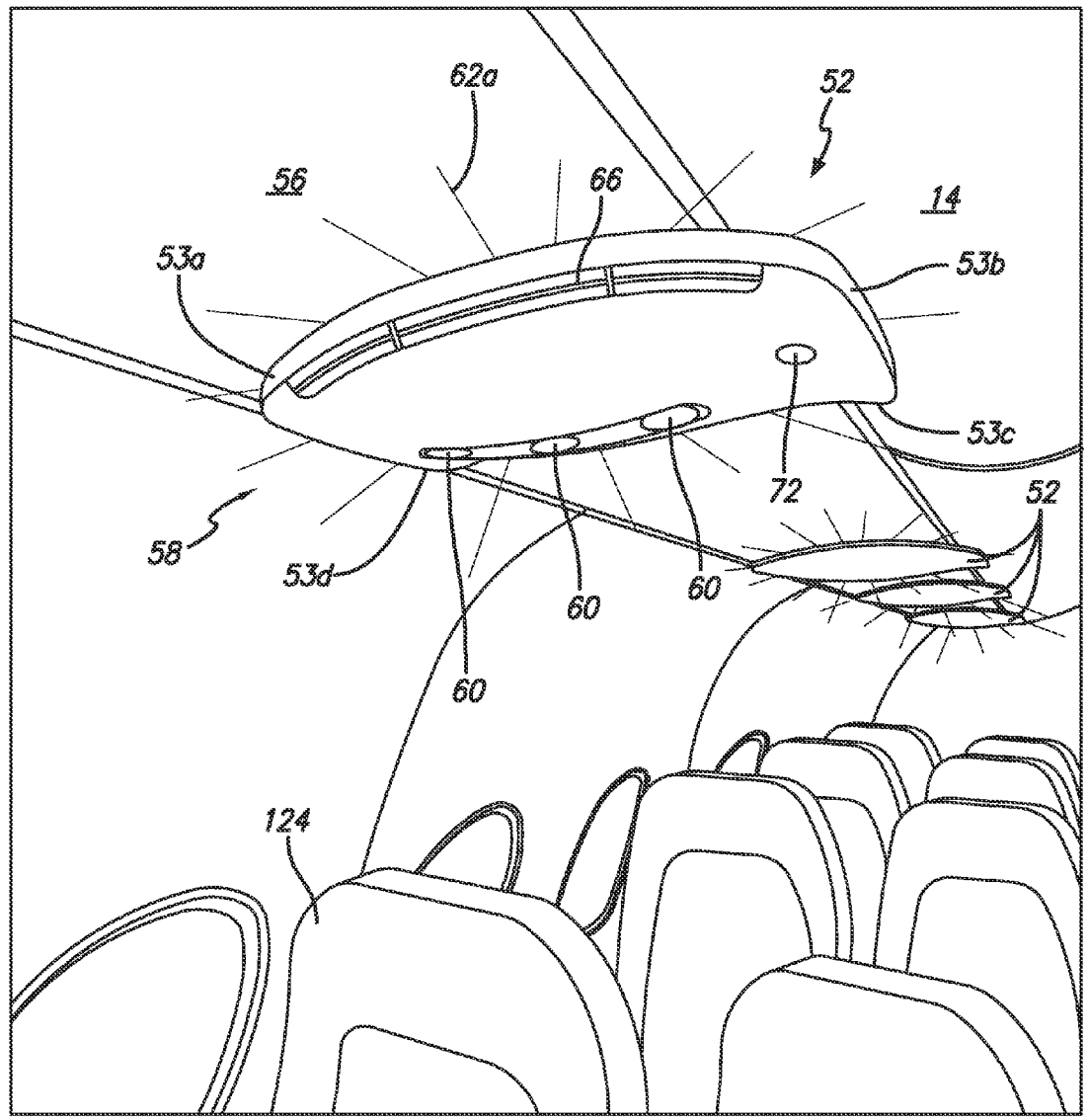
FIG. 17A is a perspective view of the interior of an aircraft showing a series of PSU pod assemblies installed therein with cabin lighting shining upwardly.
Figure 17B:
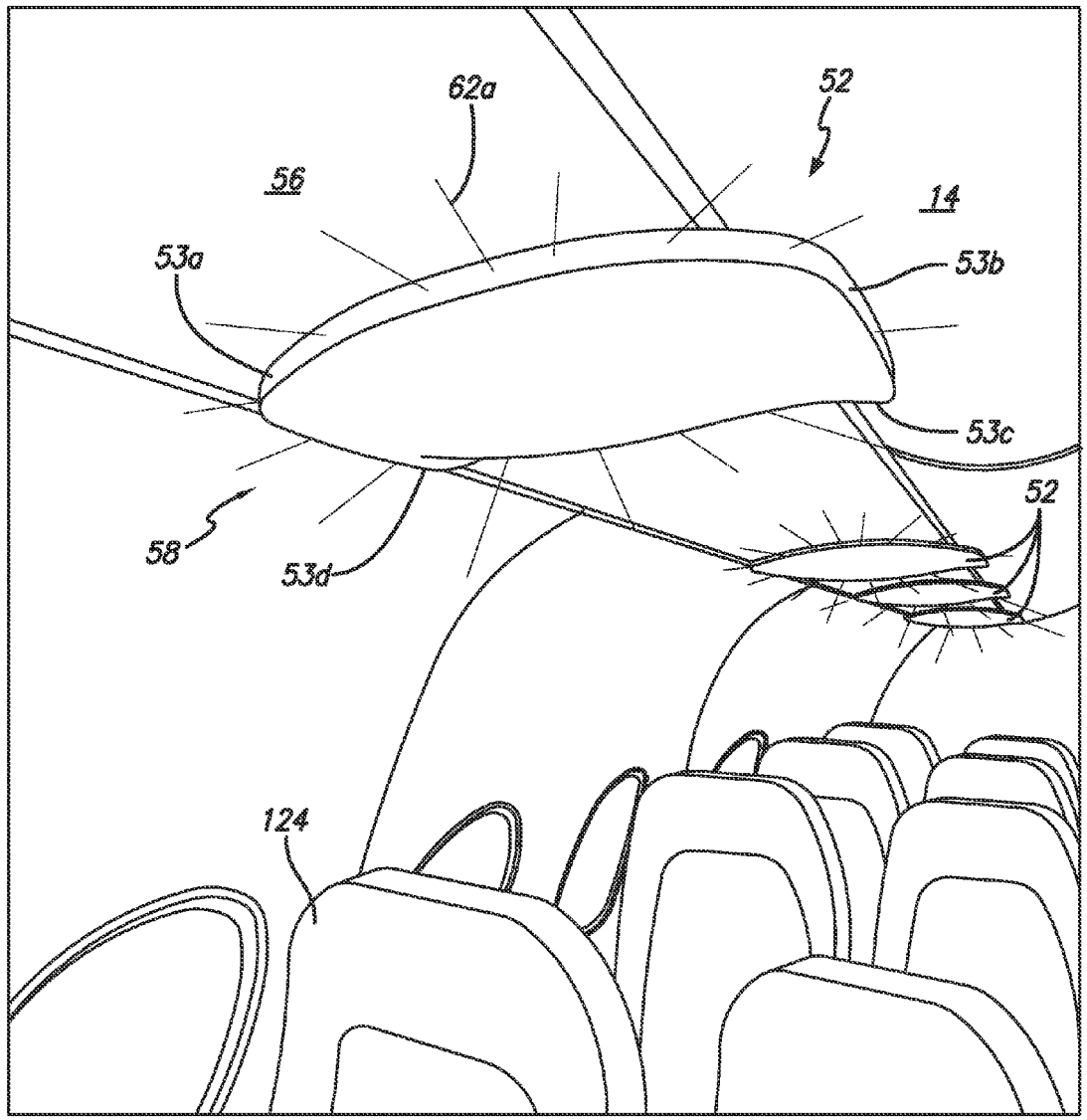
FIG. 17B is a perspective view of the interior of an aircraft showing a series of PSU pod assemblies installed therein with cabin lighting shining outwardly.
Figure 17C:
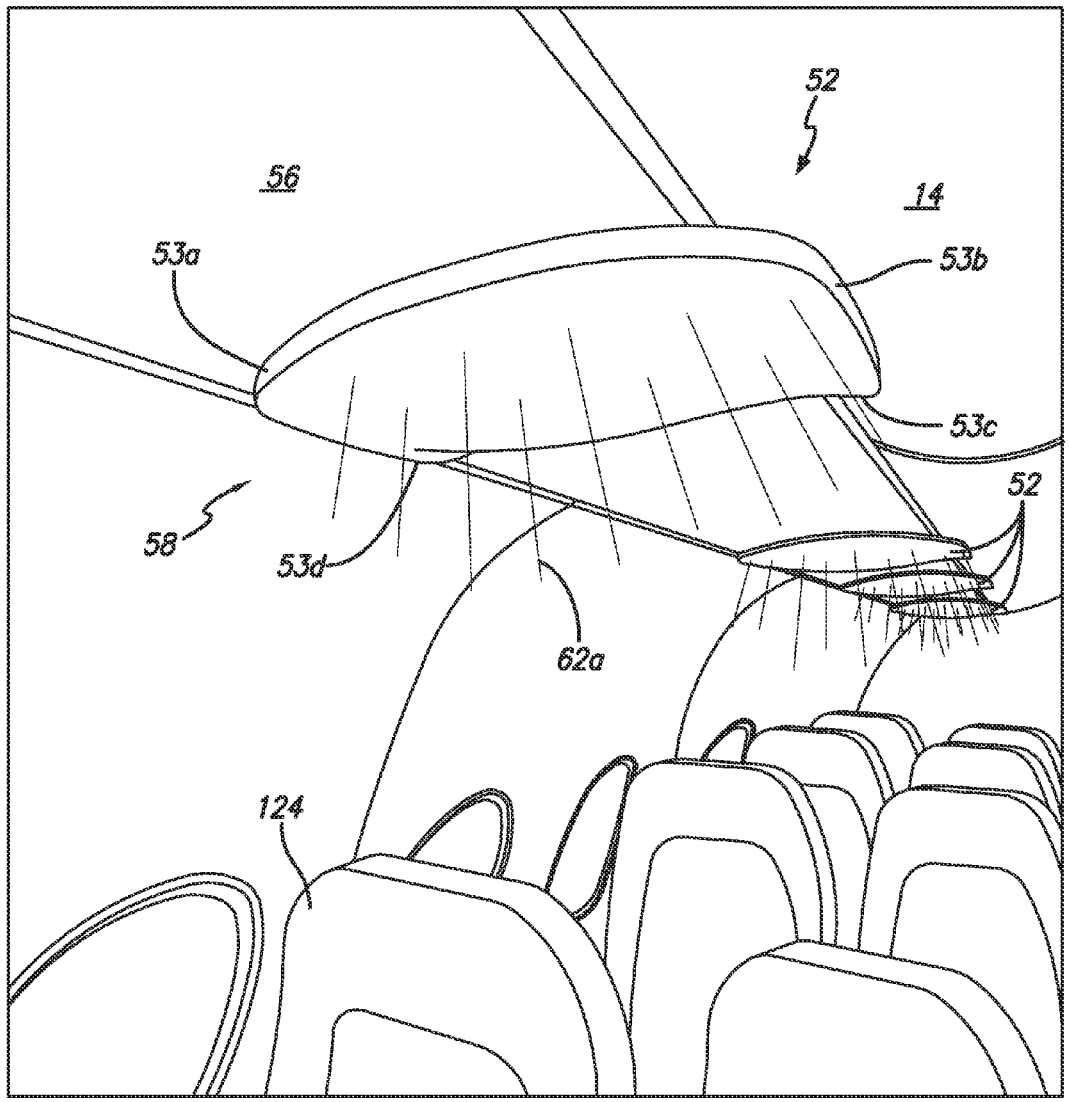
FIG. 17C is a perspective view of the interior of an aircraft showing a series of PSU pod assemblies installed therein with cabin lighting shining downwardly.
Figure 18:
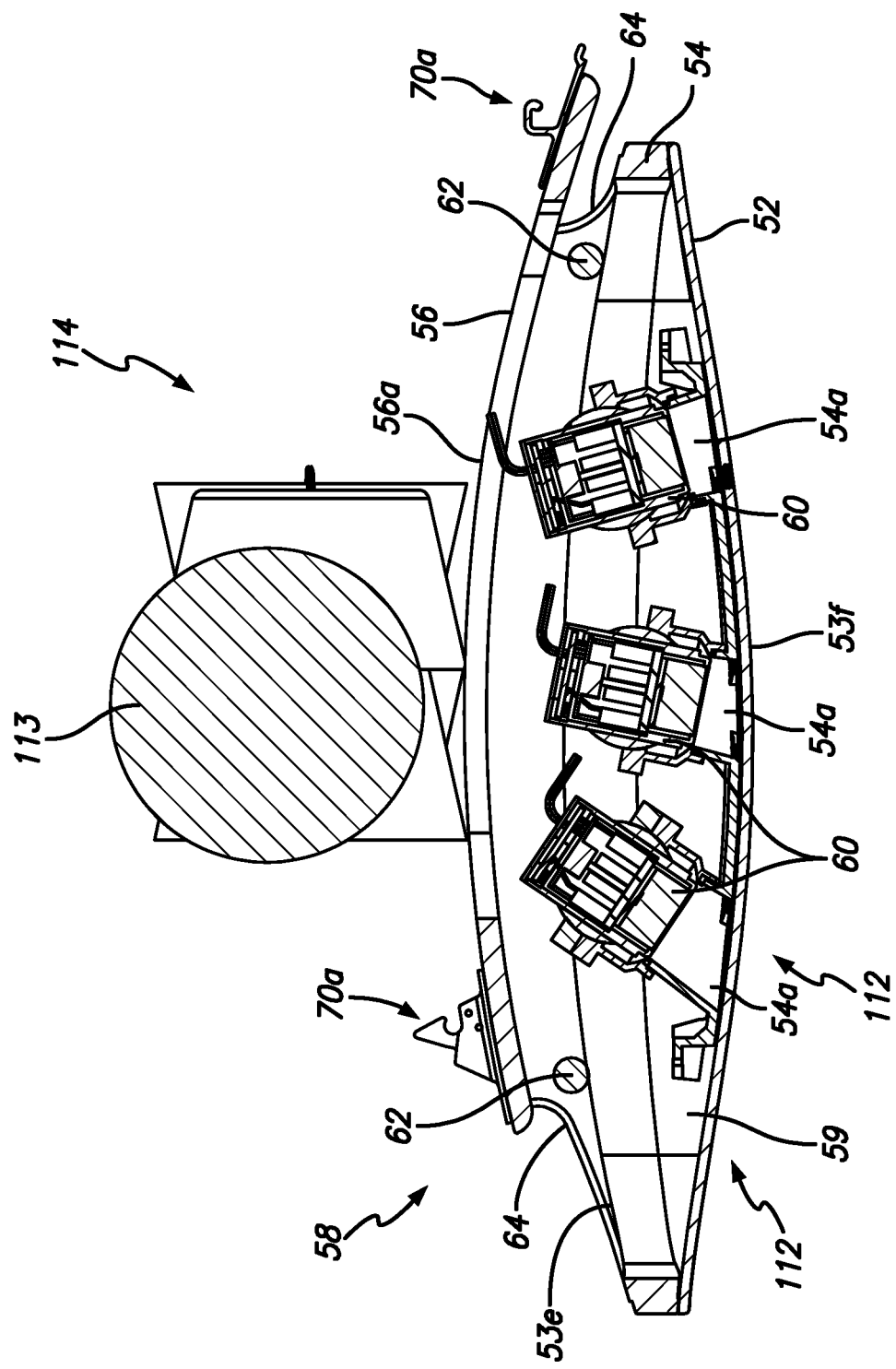
FIG. 18 is a cross-sectional view of a PSU pod assembly and showing the passenger components and system components.

With reference to at least FIGS. 16-20B, in a preferred embodiment, the pivot bin assembly 10 includes an integrated PSU channel 50 and a PSU pod 52 for each passenger row. As discussed above, aircraft PSUs typically include two types of elements: passenger elements 112 (reading lights, gaspers/air vents and flight attendant call buttons) and systems elements 114 (wiring, oxygen tanks 113/components, cabin lights and associated electronics, ducting, etc.). As shown in FIG. 18, the PSU pod 52 provides a way to at least partially separate the passenger element bundle 112 for each row from the systems elements bundle 114 for each row. By separating the passenger elements 112 from the systems elements 114 that are typically installed in a PSU, a PSU pod 52 (for the passenger elements 112) is configured or positioned independent of the systems elements 114, which are positioned in the PSU channel 50. As shown in FIGS. 18 and 20A, in a preferred embodiment, the passenger elements bundle 112 is positioned below the systems elements bundle 114. It will be appreciated that in another embodiment of the invention, the PSU pod 52 and PSU pod assembly 58 can be used with overhead bins different than the clamshell design described herein. For example, the PSU pod assembly 58 can be used with other types of pivot bins or an overhead stowage bin that is fixed but includes a pivotal door. The PSU pod assembly can be used with any overhead stowage bin that includes an enclosure for luggage and a PSU channel formed integrally therewith.

In a preferred embodiment, the PSU pod 52 preferably includes a housing 54 that includes first, second, third and fourth sides 53a, 53b, 53c and 53d, a top 53e and a bottom 53f that cooperate to define a pod interior 59, a plurality of reading lights 60 (that are aligned with and either extend through or shine light through reading light openings 54a), cabin lighting 62, a lens assembly 64 and a vent or gasper 66 defined in the housing for gasping conditioned air. It will be appreciated that the housing can be circular, ovular or elliptical in shape. For purposes of this disclosure, these shapes are considered to have first, second, third and fourth sides. In a preferred embodiment, the PSU pod 52 is part of a PSU pod assembly 58 that includes a panel 56 that has connectors 70a (such as hooks), that mate with rails or connectors 70b that are a part of the strongback 12 and extend in a direction that is generally parallel to the axis of the aircraft. In the figures, "70" is used to designate the connection between 70a and 70b. It will be appreciated that any type of connection, such as hooks, rivets, threaded fasteners, magnets, snap fit arrangements or any other method of securing the panels 56 and PSU pod 52 to the upper housing 26 or strongback 12 is within the scope of the present invention. The PSU pod 52 is connected to and extends or hangs downwardly from the panel 56, thereby creating the PSU pod assembly 58. In another embodiment, the panel can be omitted and the PSU pod itself can be connected to the rails 70b. When installed in an aircraft, wires for electrical connection (to both the reading lights 60 and the cabin lighting 62) and ducting for the gasper(s) 66 extends from the PSU channel 50 through an opening 56a (or openings) in the panel 56 and down into the housing 54. The PSU pod 52 can include a flight attendant call button 72 thereon.

As discussed above, in a preferred embodiment, the PSU pod assembly 58 also includes cabin lighting 62 that is associated with the PSU pod 52. The cabin lighting 62 can be any type of lighting (e.g., LEDs, incandescent, halogen, etc.) and can be positioned within or on housing 54. In a preferred embodiment, the PSU pod assembly 58 also includes a lens assembly 64 that helps direct light that shines from the cabin lighting 62 as desired. As is best shown in FIG. 17A, the light 62a from the cabin lighting 62 shines from the top of the PSU pod 52 and washes along and down the panels 56, bucket 14 and sidewalls, etc, of the aircraft. As a result of this arrangement, in a preferred embodiment, the PSU pods 52 provide passenger specific reading lights 60 that shine generally downwardly and outwardly and row specific cabin lighting that shines generally upwardly and outwardly. FIG. 17B shows another embodiment, where the reading lights, vent and flight attendant call button are omitted and the PSU pod 52 includes cabin lighting shining out the first, second, third and fourth sides 53a-53d. FIG. 17C shows another embodiment, where the reading lights, vent and flight attendant call button are omitted and the PSU pod 52 includes cabin lighting shining out the bottom of the housing 54. These embodiments can also include the reading lights, vent and flight attendant call button. These embodiments all create cabin lighting specifically for each row by positioning the cabin lighting on or in the PSU pods 52.

Figure 20A:
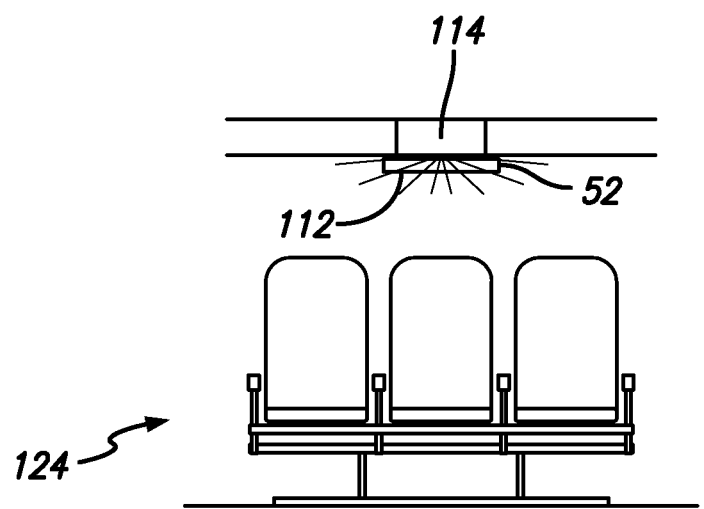
FIG. 20A is an end schematic view of a portion of an aircraft showing a series of seats with the passenger components and system components located thereabove.
Figure 20B:
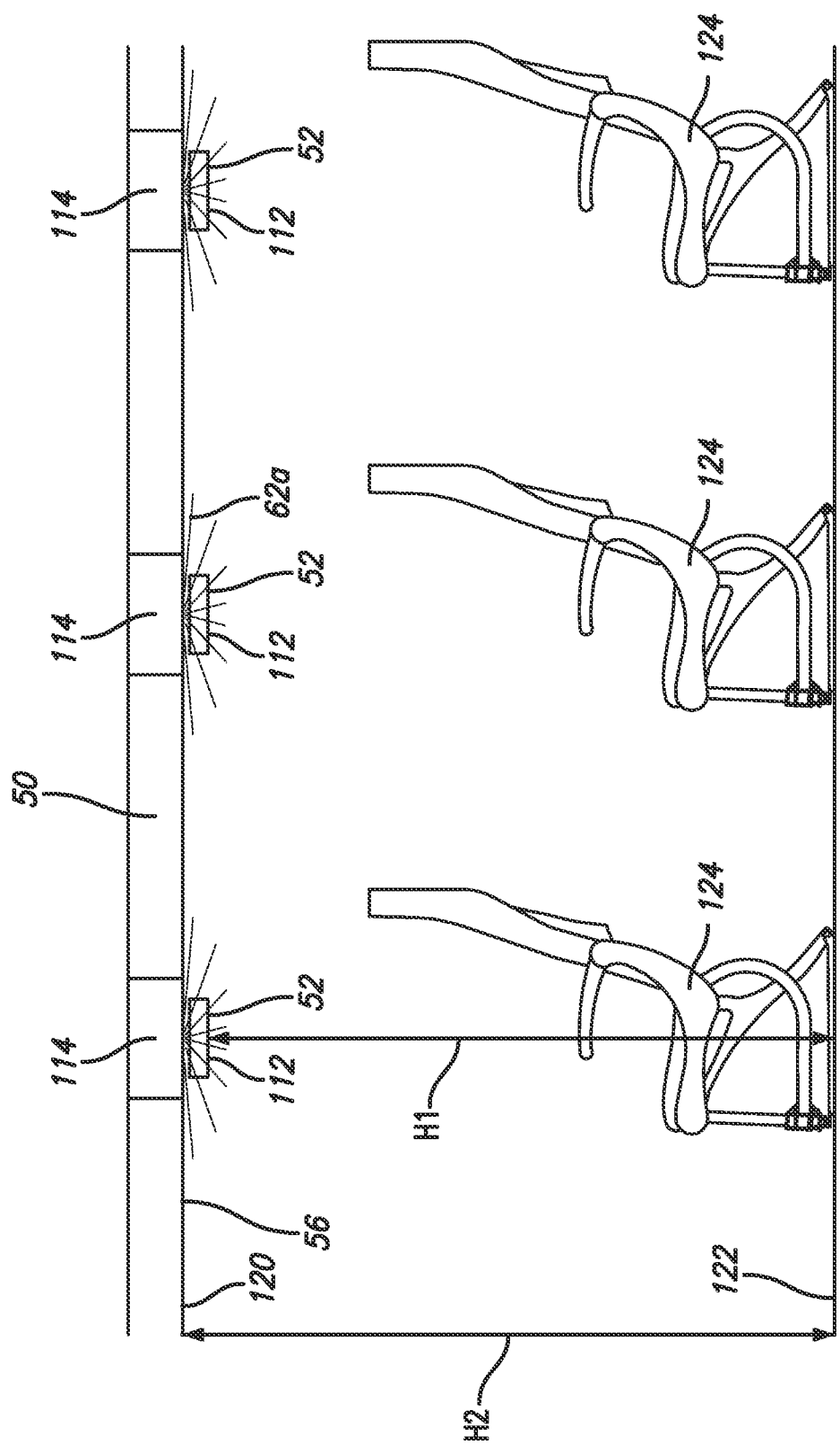
FIG. 20B is a side schematic view of a portion of an aircraft showing a series of seats with the passenger components and system components located thereabove.

With reference to FIGS. 20A-20B, as discussed above, generally, in the present invention, a passenger element bundle 112 is included in each PSU pod 52 and the systems elements 114 are disposed within the PSU channel 50 or at some other position above the ceiling defined by either the overhead bins or the panels 56 used to hide the systems elements 114. It will be understood that the systems elements 114 include both row specific elements (e.g., oxygen tanks/masks) and non-row specific elements (air ducts, electrical wiring, etc.). These elements are shown schematically in FIGS. 19A-20B as a box or bundle. However, it will be appreciated by those skilled in the art, that systems elements 114 can be located at any position along the PSU channel 50. In a preferred embodiment, the systems elements 114 are stacked generally above the PSU pod 52 and the passenger elements 112. In other words, the PSU pod 52 is positioned below the PSU channel 50 that houses the systems elements 114. However, as discussed above, not all systems elements 114 will be positioned directly above the passenger elements 112 or PSU pod 52. In other words, the passenger elements 112 or PSU pod 52 or located at a first level and the systems elements 114 are located at a second, level or height that is higher than the passenger elements 112 or PSU pod. 52.

The PSU pod 52 changes the configuration and installation methodology of the prior art by using a row specific design and a completed, channel 50 built in to and defined within the pivot bin assembly 10. Compared to the prior art, this helps eliminate or reduce unnecessary spacer panels. In a preferred embodiment, each PSU pod 52 has the same pitch or alignment with respect to each row of seats 124. It will be appreciated that the positioning of the PSU pod assembly 58 can be adjusted as a result of the connection 70 between the connectors 70a and the rails 70b. In other words, the PSU pod assembly 58 can slide fore or aft on the rails 70b. Furthermore, by reducing the number of components in the PSU channel, the height of the panels can be raised (compared to the prior art), to a height H2, that is greater than the height H1 in a similar prior art aircraft. Furthermore, although the PSU pod 52 extend downwardly below the panels 56, in a preferred embodiment, it can be positioned at a height H1 that is the same or similar to the height of the prior art ceiling 120/panel 117 height. This allows the PSU pod 52 to be positioned such that the height H2 provides more passenger space or headroom than the prior art and positions the PSU pod 52 and the elements therein or thereon (e.g., reading lights, vents, cabin lighting, etc.) at a consistent position or pitch for each row of passengers. In other words, passenger headroom height between PSU pods 52 is increased when compared to the prior art. However, the positioning of the PSU pod 52 is not a limitation on the present invention. In another embodiment, they can be positioned lower than the prior art height H1 and/or they can be positioned such that they have a different pitch than each row.

In another embodiment, the cabin lighting can be omitted or more or less reading lights can be included. The switches or buttons for the reading lights 60 can be positioned, on the PSU pod. 52 or elsewhere within reach of the passenger for which each reading light 60 is intended. In a preferred embodiment, the reading lights 60 are controlled by the passengers seated in the row for which the PSU pod 52 is designated and the cabin lighting 62 is controlled by the crew from a location remote from the passengers.

With reference to FIG. 8, in a preferred embodiment, the pivot bin assembly 10 includes an environmental control system ("ECS") that includes ducting and electrical. In a preferred embodiment, the strongback 12 serves as the enclosure of the ECS ducting. As discussed above, at least a portion of the ECS components are positioned in the PSU channel 50. However, the pivot bin assembly 10 can also include at least one further separate ECS channel 74. Electrical wire harnesses can be directly attached to the pivot bin assembly 10 instead of the aircraft for an easier and cleaner installation, when compared to the prior art. However, the ECS channel can be omitted and the ducting, electrical, etc. can be connected to the aircraft in another embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will include the words "means for"). Accordingly, the applicant reserves the right to add additional claims after tiling the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft storage bin comprising:
   an upper housing that includes first and second side panels,
   a bucket that cooperates with the upper housing to define a bin interior, wherein the bucket includes a bottom and opposing first and second sidewalls extending upwardly from the bottom,
   a first pivot mechanism operatively associated with the first side panel and the bucket, and
   a second pivot mechanism operatively associated with the second side panel and the bucket, wherein the first and second pivot mechanisms are axially aligned along a pivot axis, and wherein the bucket pivots about the pivot axis with respect to the upper housing between an open position and a closed position,
   wherein the first side panel includes a first ear extending downwardly therefrom and the second side panel includes a second ear extending downwardly therefrom, wherein the first pivot mechanism extends between the first ear and the first side of the bucket and the second pivot mechanism extends between the second ear and the second side of the bucket, and wherein, in the closed position, in a direction generally parallel to the pivot axis, the first and second side panels do not overlap the first and second sidewalls of the bucket, except for where the first and second ears overlap with the first and second sidewalls of the bucket.

2. The aircraft storage bin of claim 1 wherein the first and second side panels include a bottom edge and the first and second sidewalls of the bucket include a top edge.

3. An aircraft storage bin comprising:
   an upper housing that includes first and second side panels,
   a bucket that cooperates with the upper housing to define a bin interior, wherein the bucket includes a bottom and first and second opposing sidewalls extending upwardly from the bottom,
   a first pivot mechanism operatively associated with the first side panel and the bucket, and
   a second pivot mechanism operatively associated with the second side panel and the bucket, wherein the first and second pivot mechanisms are axially aligned along a pivot axis, and wherein the bucket pivots about the pivot axis with respect to the upper housing between an open position and a closed position, wherein the first side panel includes a first ear extending downwardly therefrom and the second side panel includes a second ear extending downwardly therefrom, wherein the first pivot mechanism extends between the first ear and the first side of the bucket and the second pivot mechanism extends between the second ear and the second side of the bucket, wherein the first and second side panels include a bottom edge and the first and second sidewalls of the bucket include a top edge, and wherein, in the closed position, at least a portion of the top edge of the first sidewall of the bucket abuts the bottom edge of the first side panel, and at least a portion of the top edge of the second sidewall of the bucket abuts the bottom edge of the second side panel.

4. The aircraft storage bin of claim 3 wherein the bottom of the bucket includes a top edge that abuts a front bottom edge of the upper housing when the bucket is in the closed position.

5. The aircraft storage bin of claim 4 wherein the top edge of the bottom and sidewalls of the bucket forms a generally continuous abutment edge that abuts the front bottom edge of the upper housing and at least a portion of the bottom edge of the first and second side panels.

6. An aircraft storage bin comprising:
an upper housing that includes first and second side panels, wherein the first and second side panels include a bottom edge,
a bucket that cooperates with the upper housing to define a bin interior, wherein the bucket includes a bottom and first and second opposing sides, wherein the first and second sides of the bucket include a top edge, wherein, in the closed position, the top edge of the bottom and sides of the bucket form a generally continuous abutment edge that abuts the front bottom edge of the upper housing and at least a portion of the bottom edge of the first and second side panels,
a first pivot mechanism operatively associated with the first side panel and the bucket, and
a second pivot mechanism operatively associated with the second side panel and the bucket, wherein the first and second pivot mechanisms are axially aligned along a pivot axis, and wherein the bucket pivots about the pivot axis with respect to the upper housing between an open position and a closed position,
wherein the first side panel includes a first ear extending downwardly therefrom and the second side panel includes a second ear extending downwardly therefrom, wherein the first side of the bucket includes a first indented portion that receives the first ear and the second side of the bucket includes a second indented portion that receives the second ear, and wherein the first pivot mechanism extends between the first ear and the first indented portion and the second pivot mechanism extends between the second ear and the second indented portion.

7. The aircraft storage bin of claim 1 further comprising at least one latch assembly for securing the bucket to the upper housing in the closed position.

8. The aircraft storage bin of claim 7 further comprising first and second latch assemblies, wherein the first latch assembly is associated with the first side panel and the first sidewall of the bucket, and wherein the second latch assembly is associated with the second side panel and the second sidewall of the bucket.

9. The aircraft storage bin of claim 8 wherein the first and second side panels each have a bottom edge and the first and second sidewalls of the bucket each have a top edge, wherein the first latch assembly includes a first hook portion and a first striker portion, wherein one of the first hook portion and the first striker portion extends downwardly from the first side panel and below the bottom edge thereof and the other of the first hook portion and the first striker portion is associated with the first sidewall of the bucket, wherein the second latch assembly includes a second hook portion and a second striker portion, wherein one of the second hook portion and the second striker portion extends downwardly from the second side panel and below the bottom edge thereof and the other of the second hook portion and the second striker portion is associated with the second sidewall of the bucket.

10. The aircraft storage bin of claim 9 wherein the first hook portion extends downwardly from the bottom edge of the first side panel and the first striker portion is positioned in a first recess defined in the top edge of the first sidewall of the bucket, and wherein the second hook portion extends downwardly from the bottom edge of the second side panel and the second striker portion is positioned in a second recess defined in the top edge of the second sidewall of the bucket.

11. An aircraft storage bin comprising:
an upper housing that includes first and second side panels that each include a bottom edge,
a bucket that cooperates with the upper housing to define a bin interior, wherein the bucket is pivotally connected to the upper housing and pivots about a pivot axis with respect to the upper housing between an open position and a closed position, wherein the bucket includes a bottom and first and second sidewalls, wherein the first and second side walls each include a top edge, and
first and second latch assemblies, wherein the first latch assembly includes a first hook portion and a first striker portion, wherein one of the first hook portion and the first striker portion extends downwardly from the first side panel and below the bottom edge thereof or upwardly from the first sidewall of the bucket, and the other of the first hook portion and the first striker portion is positioned in a first recess defined in the top edge of the first sidewall of the bucket or the first side panel, and wherein the second latch assembly includes a second hook portion and a second striker portion, wherein one of the second hook portion and the second striker portion extends downwardly from the second side panel and below the bottom edge thereof or upwardly from the second sidewall of the bucket, and the other of the second hook portion and the second striker portion is positioned in a second recess defined in the top edge of the second sidewall of the bucket or the second side panel.

12. An aircraft storage bin comprising:
an upper housing that includes first and second side panels,
a bucket that cooperates with the upper housing to define a bin interior,
a first pivot mechanism operatively associated with the first side panel and the bucket, and
a second pivot mechanism operatively associated with the second side panel and the bucket, wherein the first and second pivot mechanisms are axially aligned along a pivot axis, and wherein the bucket pivots about the pivot axis with respect to the upper housing between an open position and a closed position,
wherein the first side panel includes a first ear extending downwardly therefrom and the second side panel includes a second ear extending downwardly therefrom, and wherein the first pivot mechanism extends between the first ear and the first side of the bucket and the second pivot mechanism extends between the second ear and the second side of the bucket, wherein the first and second pivot mechanisms comprise first and second rotary dampers that damp the rotation of the first and second pivot mechanisms, respectively, when the bucket pivots to the open position.

13. The aircraft storage bin of claim 6 wherein the first and second pivot mechanisms comprise first and second rotary dampers that damp the rotation of the first and second pivot mechanisms, respectively, when the bucket pivots to the open position, wherein the first rotary damper is positioned in an opening in the first ear and a first pivot axle extends from the first rotary damper to the first sidewall of the bucket, and wherein the second rotary damper is positioned in an opening in the second ear and a second pivot axle extends from the second rotary damper to the second sidewall of the bucket.

14. The aircraft storage bin of claim 1 wherein the upper housing includes a passenger service unit channel integral therewith that is positioned adjacent the bucket.

15. The aircraft storage bin of claim 14 wherein the passenger service unit channel includes at least a first passenger service unit pod extending downwardly therefrom.

16. The aircraft storage bin of claim 15 wherein the upper housing includes first and second rails and the passenger service unit pod extends downwardly from a panel that includes first and second connectors, wherein the first and second connectors are secured to the first and second rails, respectively.

17. The aircraft storage bin of claim 15 wherein the passenger service unit channel includes systems components disposed therein, and wherein the passenger service unit pod includes passenger components disposed therein.

18. The aircraft storage bin of claim 14 wherein the upper housing includes an ECS channel integral therewith, and wherein the ECS channel is separate from the passenger service unit channel.

19. The aircraft storage bin of claim 1 in combination with four pieces of luggage, wherein each piece of luggage includes a top, a bottom, a front, a back and two sides, wherein the four pieces of luggage are received in the bin interior and positioned such that one of the two sides of each piece of luggage is resting on the bucket bottom when the bucket is in the closed position.

20. The aircraft storage bin of claim 1 wherein the bucket is made of a single piece that is created on a mold.

21. The aircraft storage bin of claim 8 wherein a portion of the first latch assembly extends below the bottom edge of the first side panel, and wherein a portion of the second latch assembly extends below the bottom edge of the second side panel.

22. The aircraft storage bin of claim 1 wherein the upper housing includes a top and the first and second side panels extending downwardly from the top, wherein, in the closed position, the bottom and first and second sidewalls of the bucket define a lower portion of the bin interior and the top and side panels of the upper housing define an upper portion of the bin interior, and wherein the lower portion and upper portion cooperate to define the bin interior when the bucket is in the closed position.

23. The aircraft storage bin of claim 11 wherein the first hook portion extends upwardly from the top edge of the first sidewall of the bucket and the first striker portion is positioned in a first recess defined in the bottom edge of the first side panel, and wherein the second hook portion extends upwardly from the top edge of the second sidewall of the bucket and the second striker portion is positioned in a second recess defined in the bottom edge of the second side panel.

24. The aircraft storage bin of claim 11 wherein the first hook portion extends downwardly from the bottom edge of the first side panel and the first striker portion is positioned in the first recess defined in the top edge of the first sidewall of the bucket, and wherein the second hook portion extends downwardly from the bottom edge of the second side panel and the second striker portion is positioned in the second recess defined in the top edge of the second sidewall of the bucket.

25. The aircraft storage bin of claim 24 wherein, in the closed position, at least a portion of the top edge of the first sidewall of the bucket abuts the bottom edge of the first side panel, and at least a portion of the top edge of the second sidewall of the bucket abuts the bottom edge of the second side panel.

26. The aircraft storage bin of claim 11 wherein the first and second latch assemblies are in electrical communication with an operating member disposed on the bucket.

27. An aircraft storage bin comprising:
an upper housing that includes first and second side panels, wherein the first and second side panels include a bottom edge,
a bucket that cooperates with the upper housing to define a bin interior, wherein the bucket includes a bottom and first and second opposing sides, wherein when the pivot bin assembly receives luggage in the bin interior, the luggage is positioned on the bottom of the bucket, whereby the bucket is load bearing, wherein the first and second sides of the bucket include a top edge, wherein the bottom of the bucket includes a top edge,
a first pivot mechanism operatively associated with the first side panel and the bucket, and
a second pivot mechanism operatively associated with the second side panel and the bucket, wherein the first and second pivot mechanisms are axially aligned along and rotatable about a pivot axis, and wherein the bucket pivots about the pivot axis with respect to the upper housing between an open position and a closed position, and wherein, when the bucket is in the closed position, the top edge of the bottom and sides of the bucket forms a generally continuous abutment edge that abuts the front bottom edge of the upper housing and at least a portion of the first and second side panels, and
first and second latch assemblies for securing the bucket to the upper housing in the closed position, wherein the first latch assembly includes a first hook portion and a first striker portion and the second latch assembly includes a second hook portion and a second striker portion, wherein the first hook portion extends downwardly from the bottom edge of the first side panel and the first striker portion is positioned in a first recess defined in the top edge of the first side of the bucket, wherein the second hook portion extends downwardly from the bottom edge of the second side panel and the second striker portion is positioned in a second recess defined in the top edge of the second side of the bucket, and wherein the first and second latch assemblies are in electrical communication with an operating member disposed on the bucket,
wherein the first side panel includes a first ear extending downwardly therefrom and the second side panel includes a second ear extending downwardly therefrom, wherein the first side of the bucket includes a first indented portion that receives the first ear and the second side of the bucket includes a second indented portion that receives the second ear, and wherein the first pivot mechanism extends between the first ear and the first indented portion and the second pivot mechanism extends between the second ear and the second indented portion.

28. The aircraft storage bin of claim 27 wherein the first and second pivot mechanisms comprise first and second rotary dampers that damp the rotation of the first and second pivot mechanisms, respectively, when the bucket pivots to the open position, wherein the first rotary damper is positioned in an opening in the first ear and a first pivot axle extends from the first rotary damper to the first side of the bucket, and wherein the second rotary damper is positioned in an opening in the second ear and a second pivot axle extends from the second rotary damper to the second side of the bucket.

29. A dual aircraft storage bin assembly comprising first and second aircraft storage bins of claim 1 positioned adjacent one another and including a common upper housing.

30. An aircraft that comprises a cabin having a side wall, and at least first and second aircraft storage bins of claim 1 connected to the side wall.

31. The aircraft of claim 30 wherein four pieces of luggage are received in the bin interior of the first aircraft storage bin and four pieces of luggage are received in the bin interior of the second aircraft storage bin, wherein each piece of luggage includes a top, a bottom, a front, a back and two sides, wherein each piece of luggage is positioned such that one of the two sides is resting on the bucket bottom when the bucket is in the closed position.

32. An aircraft storage bin comprising:
an upper housing that includes first and second side panels, wherein the first side panel includes a first ear and the second side panel includes a second ear,
a bucket that cooperates with the upper housing to define a bin interior, wherein the bucket includes first and second sides,
a first pivot mechanism operatively associated with the first ear and the bucket, and
a second pivot mechanism operatively associated with the second ear and the bucket, wherein the bucket pivots about a pivot axis with respect to the upper housing between an open position and a closed position, and wherein, in the closed position, in a direction generally parallel to the pivot axis, the first and second side panels do not overlap the first and second sidewalls of the bucket, except for where the first and second ears overlap with the first and second sides of the bucket.

33. The aircraft storage bin of claim 32 further comprising first and second latch assemblies, wherein the first latch assembly is associated with the first side panel and the first side of the bucket, wherein the second latch assembly is associated with the second side panel and the second side of the bucket, wherein the first and second side panels each include a bottom edge, and wherein a portion of the first latch assembly extends below the bottom edge of the first side panel and a portion of the second latch assembly extends below the bottom edge of the second side panel.

34. The aircraft storage bin of claim 32 wherein the first ear extends downwardly from the first side panel, and wherein the second ear extends downwardly from the second side panel.

35. The aircraft storage bin of claim 34 wherein the first pivot mechanism includes a first pivot axle that extends between the first ear and the first side of the bucket, and wherein the second pivot mechanism includes a second pivot axle that extends between the second ear and the second side of the bucket.

36. The aircraft storage bin of claim 32 further comprising at least one stop member positioned within the bin interior to maintain the bucket in the open position.

* * * * *